United States Patent [19]

Nanba et al.

[11] Patent Number: 5,913,091
[45] Date of Patent: Jun. 15, 1999

[54] IMAGE READING APPARATUS

[75] Inventors: Katsuhiro Nanba, Okazaki; Toshio Kitaoka, Toyokawa; Mitsutoshi Yagoto, Okazaki; Toshikazu Suzuki, Toyokawa, all of Japan

[73] Assignee: Minolta Co., Ltd., Osaka, Japan

[21] Appl. No.: 08/861,208

[22] Filed: May 21, 1997

[30] Foreign Application Priority Data

| May 21, 1996 | [JP] | Japan | ..................................... 8-125544 |
| May 21, 1996 | [JP] | Japan | ..................................... 8-126120 |
| May 14, 1997 | [JP] | Japan | ..................................... 9-123724 |

[51] Int. Cl.$^6$ ......................... G03G 15/00; G03G 15/041
[52] U.S. Cl. ........................... 399/32; 358/474; 358/497; 399/36; 399/202; 399/211; 399/212
[58] Field of Search .................... 399/32, 36, 81, 399/118, 202, 211, 212; 358/474, 497

[56] References Cited

U.S. PATENT DOCUMENTS

| 4,603,963 | 8/1986 | Hinton et al. | ........................... 399/212 |
| 4,862,218 | 8/1989 | Tsunoda et al. | ......................... 399/118 |
| 5,191,377 | 3/1993 | Kagiura et al. | ...................... 399/212 X |
| 5,575,577 | 11/1996 | Kawakami et al. | ................. 400/705.1 |
| 5,606,206 | 2/1997 | Stephany et al. | ....................... 399/211 |

FOREIGN PATENT DOCUMENTS

| 57-052365 | 3/1982 | Japan . |
| 59-006767 | 1/1984 | Japan . |

*Primary Examiner*—William J. Royer
*Attorney, Agent, or Firm*—Sidley & Austin

[57] ABSTRACT

An image reading apparatus includes one or more sliders which carry optical parts and can linearly reciprocate in a predetermined direction. The apparatus optically scans and thereby reads an image on an original document located at a predetermined position. The image reading apparatus includes a magnetic encoder for detecting positions of the sliders.

18 Claims, 21 Drawing Sheets

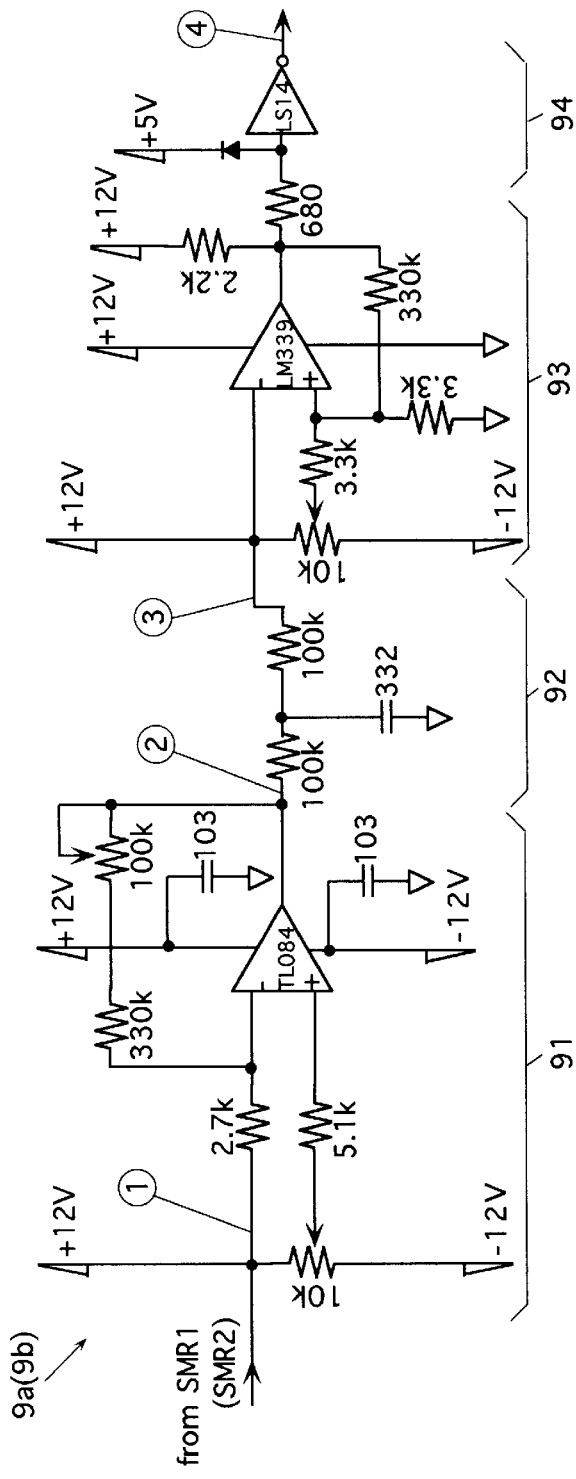
Fig.5(A)
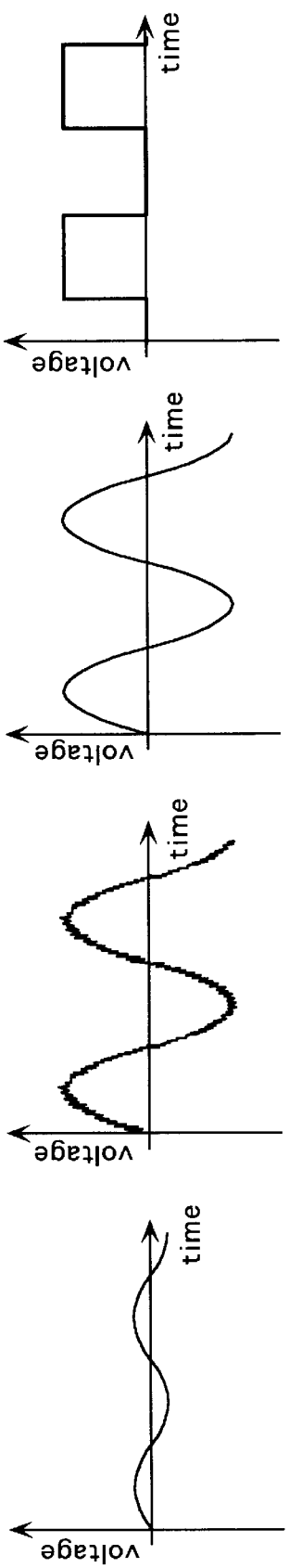
Fig.5(B) Waveform at ①
Fig.5(C) Waveform at ②
Fig.5(D) Waveform at ③
Fig.5(E) Waveform at ④

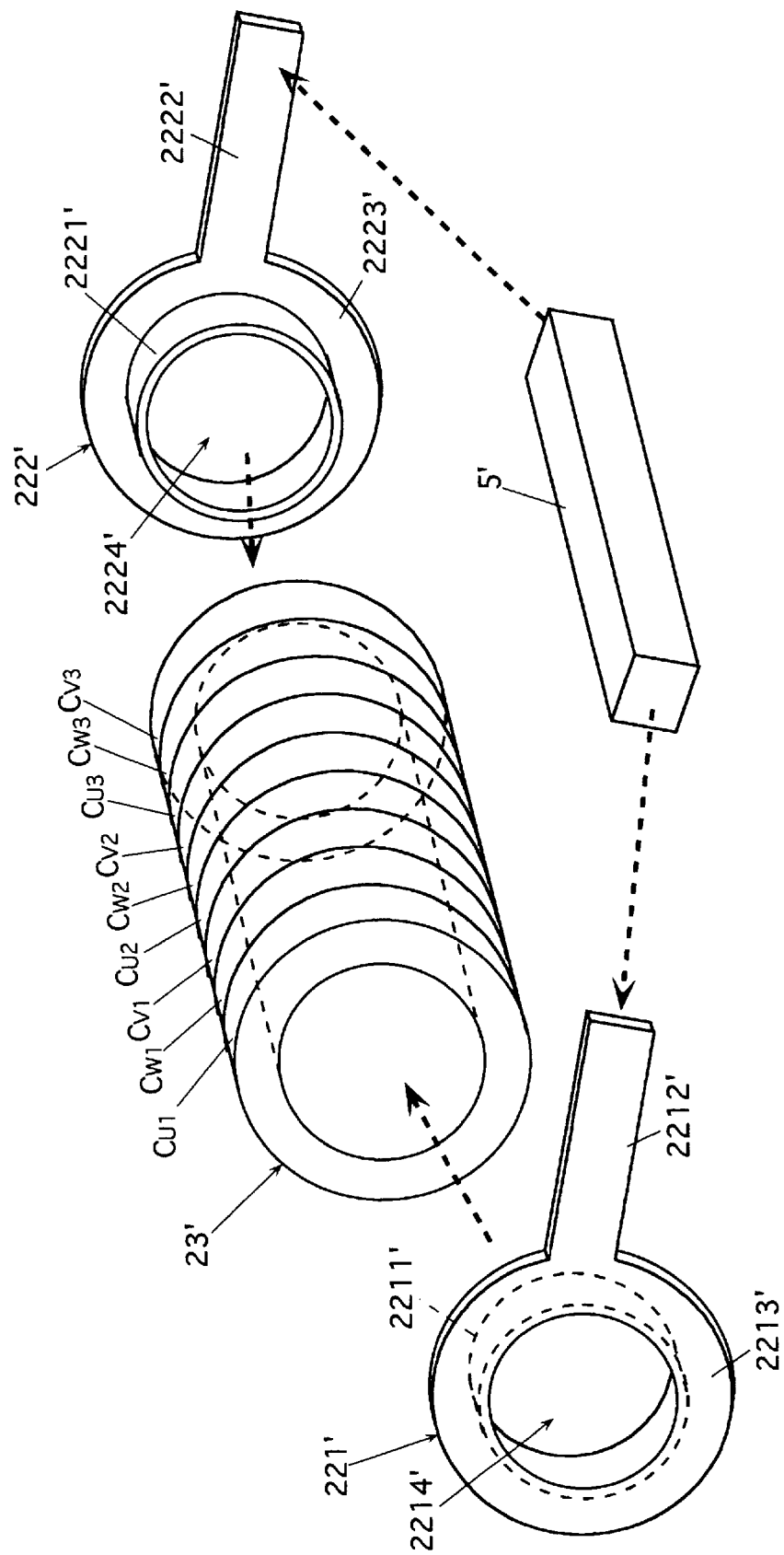

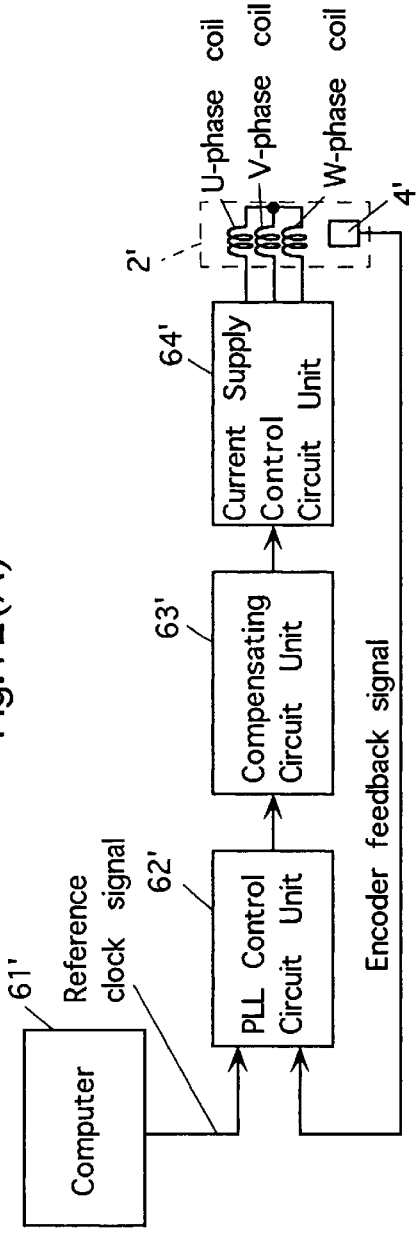
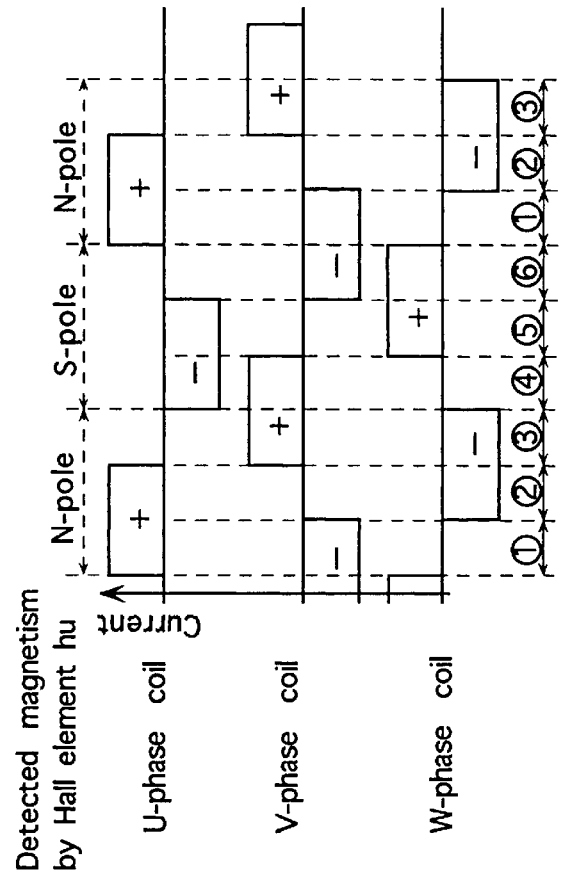
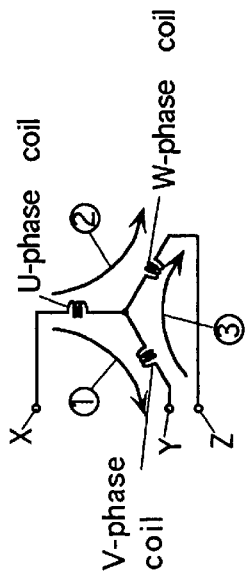
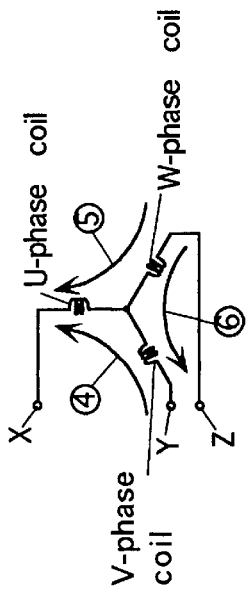

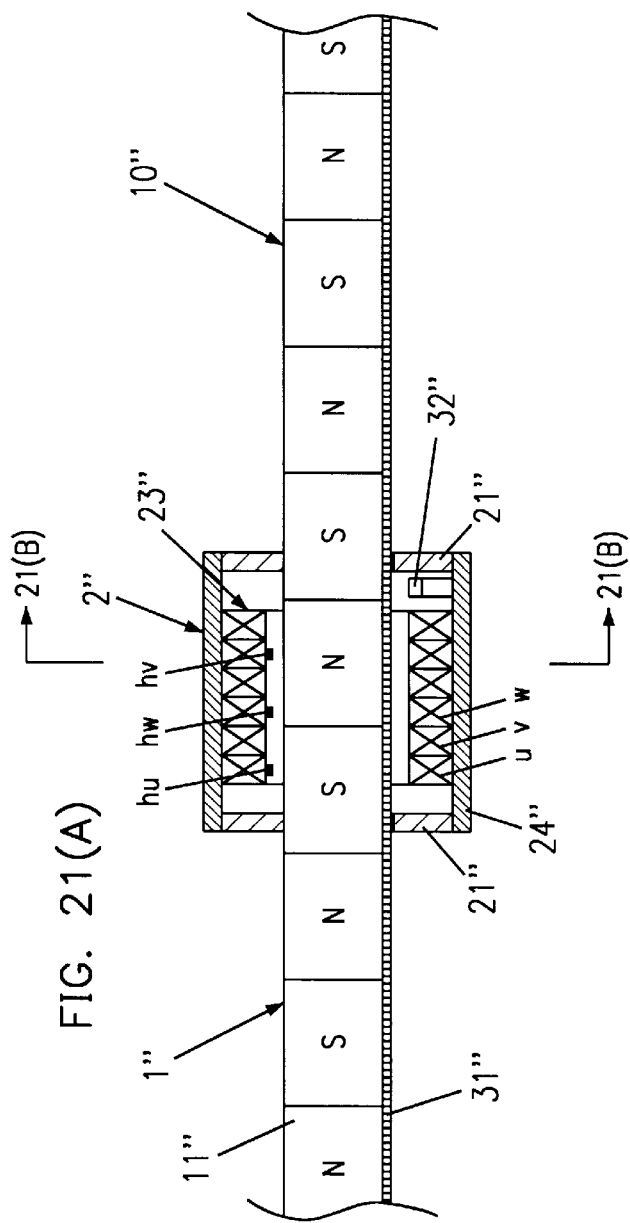
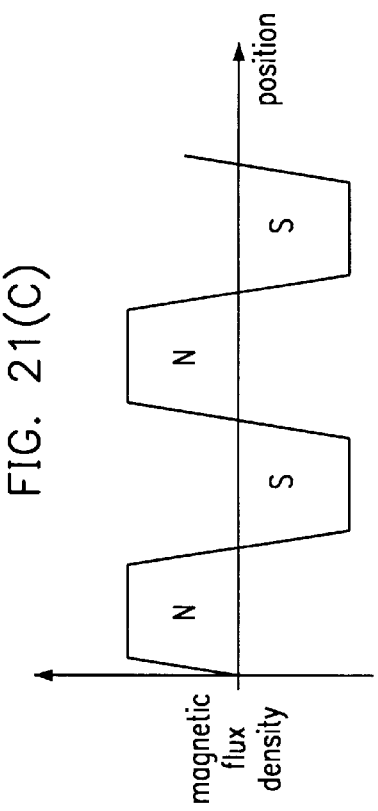
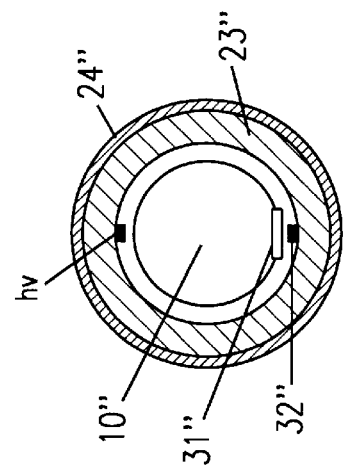

IMAGE READING APPARATUS

BACKGROUND OF THE INVENTION

1. Field of the Invention

The present invention relates to an image reading apparatus employed in a copying machine, an image scanner or others, and in particular to an image reading apparatus which uses a fluorescent lamp as a lighting device for optically scanning an original image, and/or is provided with a liquid crystal display (LCD) for displaying various kinds of information.

Also, the invention relates to a linear motor for driving, e.g., a reciprocatable slider which carries an optical part in an image reading apparatus, and in particular to a shaft-type linear motor which includes a stator in a shaft form having a field magnet extending in a constant direction, and also includes a movable piece having an armature coil fitted around the field magnet for reciprocation along the stator.

2. Description of the Background Art

Image reading apparatuses for optically scanning an original image have been broadly used, for example, in copying machines and have also been used as image scanners coupled with computers or the like.

The image reading apparatus generally includes first and second sliders. The first slider is reciprocatable and carries a lighting device for lighting an original document laid at a predetermined position and a reflection mirror for leading the image light beams reflected by the original document in a predetermined direction. The second slider carries reflection mirrors for leading the image light beams coming from the reflection mirror on the first slider in a predetermined direction, and can reciprocate in the same direction as the first slider.

As the lighting device carried on the first slider, a fluorescent lamp is generally used. The power circuit or driving circuit for the fluorescent lamp is generally arranged at a deep position (i.e., rear position) in the apparatus. One of the reasons for this arrangement is as follows. A sufficient space is left at the rear position in the apparatus, and an inlet of AC power supply of the apparatus is also located at the rear position in the apparatus in many cases. Therefore, the circuit located at the rear position does not require complicated wiring.

The image reading apparatus such as an image scanner and a copying machine equipped with the image reading apparatus are generally provided with an operation panel having key switches and a display or the like for displaying various kinds of information. A LCD is now used as this display in many cases, and the operation panel is usually arranged at the front side of the apparatus for easy operation by operators.

In the above image reading apparatus, and particularly in the image reading apparatus, for example, equipped with the foregoing two sliders carrying the optical devices or parts, an image on an original document laid at a predetermined position (e.g., on an original document table glass) is read in such a manner that a lighting device carried on the first slider is turned on, the first slider is driven at a predetermined speed in the predetermined direction parallel with the original document, and concurrently the second slider is driven in the same direction as the first slider at half the speed of the first slider. Thereby, the original document is scanned entirely and optically. During this scanning, light beams, which are issued from the lighting device and are reflected by the original image, are lead in the predetermined direction by the mirrors on the first and second sliders. An image sensor such as a CCD is arranged at a position to which the image light beams are led by the mirrors. The image sensor can read the original image. Alternatively, if the image reading apparatus is arranged, for example, in an analog copying machine, the original image light beams led by the above mirrors are led by another mirror or the like, if necessary, to a photosensitive member for forming an electrostatic latent image corresponding to the original image.

As described above, the optical parts for optically scanning and reading the original image are carried on the sliders, and, for example, linear motors may be used for linearly reciprocating the sliders.

The linear motors can be classified into various types such as a linear DC motor, a linear pulse motor and a linear induction motor, which have distinctive features suitable to use in various kinds of equipments for linearly moving objects, respectively.

For example, in a linear induction motor taught by U.S. Pat. No. 4,562,385, an armature coil group formed of a plurality of armature coils is fitted around a shaft member provided with a field magnet. The shaft member forms a movable piece, and the armature coil group forms a stator. In this linear induction motor, the armature coil group of the stator is covered and protected by a cylindrical cover.

FIG. 25 is a schematic side view of an example of a linear motor. This linear motor has a field magnet 911' in a shaft-like form on which magnetic poles of N- and S-types are arranged linearly and alternately to each other, and an armature coil 921' fitted around the field magnet 911'. The armature coil 921' is carried at an inner periphery of a yoke 922' made of a ferromagnetic material in a hollow cylindrical form. Slide bearings 923' fitted around the field magnet 911' are arranged at opposite open ends of the yoke 922', so that the armature coil 921' and the yoke 922' can smoothly move along the field magnet 911'. In this linear motor, the field magnet 911' functions as a stator 91', and the coil 921' and yoke 922' function as a movable piece 92' reciprocatable along the stator 91'. When the armature coil 921' is energized, the movable piece 92' generates a driving force and moves along the stator 91' owing to an interaction with respect to a magnetic field produced by the field magnet 911'. Owing to provision of the yoke 922' made of a ferromagnetic material, the magnetic field, which is produced by the field magnet 911' at the position opposed to the yoke 922', is liable to form a magnetic loop through the yoke 922', so that the intensity of the magnetic field acting on the armature coil 921' inside the yoke 922' is larger than that in the case where the yoke is not employed. Therefore, the linear motor can generate a larger driving force. Thus, owing to the yoke 922', the magnetic field formed by the field magnet 911' can efficiently act on the coil 921'.

In the linear motor of the foregoing type which includes the shaft-like stator having the field magnet extending in the predetermined direction and the movable piece having the armature coil fitted around the field magnet, the shaft-like stator itself can be utilized also as a guide member for the movable piece, so that the structure can be simplified. For this and other reasons, the linear motors of the above type have been broadly used for linearly moving objects in fields of office automation equipments such as a copying machine, a printer and an image scanner as well as factory automation equipments such as an X-Y table and an object transporting device, and optical equipments such as a camera.

The linear motor described above usually includes a linear encoder for detecting a position of the movable piece or the like. Likewise, the image reading apparatus provided with the reciprocatable slider usually includes a linear encoder for detecting a position of each slider or the like. The encoder may be utilized for controlling a position and/or a speed in addition to detection of the position of a moving object such as the movable piece or sliders. An optical type and a magnetic type of the linear encoder have been known. For example, the magnetic encoder is generally provided with a magnetic encoder scale having S- and N-type magnetic poles arranged alternately with a fine pitch, and a magnetism detecting element (e.g., an MR element which is a magnetoelectric resistance element) for detecting the magnetic field formed by the encoder scale. The encoder scale is stationarily arranged parallel to the moving direction of the movable object such as the movable piece or the slider. The magnetism detecting element is opposed to the encoder scale, and is disposed on the movable object for movement together with the movable object. The magnetism detecting element is usually used together with an amplifier circuit for amplifying an extremely weak detection signal of the magnetism detecting element, and a detecting circuit including a circuit or the like for digitizing the signal.

However, in the case where the foregoing magnetic encoder is used as a linear encoder for detecting a position of the movable object such as the movable piece or the slider, the magnetism detection element (e.g., MR element) and the detection circuit are liable to be affected by noises, because it processes extremely weak signals and analog signals. In the foregoing image reading apparatus, noise sources of the noises may be the fluorescent lamp turn-on circuit and the LCD. If the fluorescent lamp and/or the LCD are arranged near the magnetism detecting element and/or the detection circuit, these element and circuit may be affected by noises, and therefore a problem may arise in the position detection. When a problem arises in position detection, image reading can not be precisely performed, and the slider may run away out of control or collide with another member. A similar problem may occur in the linear motor provided with the magnetic encoder. When a magnetic field is present near the linear motor, the magnetic field may cause problems in position detection by the magnetism detecting element and/or the detecting circuit.

In addition to the foregoing, in the linear induction motor taught by U.S. Pat. No. 4,562,385, although the stator, i.e., armature coil group is protected by the cylindrical cover, a protection cover is not provided for the movable shaft member. Therefore the motor suffers from such a problem that dust or the like may adhere onto the shaft member and thereby may impede sliding on the stator.

A similar problem may arise even in a shaft-type linear motor, in which a shaft member provided with a field magnet forms a stator and a member having an armature coil and fitted around the stator forms a movable piece in contrast to the above linear induction motor.

For example, in the linear motor shown in FIG. 25, dust or the like may adhere onto the stator 91' in a shaft form, in which case a sliding resistance varies during sliding of the movable piece 92' along the stator 91', and the movable piece 92' cannot smoothly move along the stator 91'.

The linear motor shown in FIG. 25 also suffers from another problem. When the movable piece 92' moves relatively to the stator 91', a load varies due to variation in a magnetic attractive force which is exerted by the field magnet 911' acting on the end of the yoke 922' of the movable piece 92', so that cogging of the movable piece 92' occurs, and thus smooth movement of the movable piece 92' is prevented.

SUMMARY OF THE INVENTION

Accordingly, the invention aims to provide an image reading apparatus including one or more sliders which carry optical parts and can linearly reciprocate in a predetermined direction for optically scanning and thereby reading an image on an original document located at a predetermined position, and particularly an image reading apparatus provided with position detecting means such as a magnetic encoder for detecting positions of the sliders. More specifically, the invention has the following objects.

An object of the invention is to provide an image reading apparatus of the above mentioned type, in which a lighting device is carried on one of the sliders for lighting an original document, and a power circuit of the lighting device may generate noises such as high frequency noises, and particularly an image reading apparatus, which can suppress an influence exerted by the noises on detection of the slider positions by the position detecting means to a substantially allowed level, and thereby can perform good image reading, and also, in which run-away out of control and collision of the sliders can be suppressed to a higher extent.

Another object of the invention is to provide an image reading apparatus of the above mentioned type, in which an LCD is employed for displaying various kinds of information, and the LCD may generate noises such as high frequency noises, and particularly an image reading apparatus, which can suppress an influence exerted by the noises on detection of the slider positions by the position detecting means to a substantially allowed level, and thereby can perform good image reading, and also, in which run-away out of control and collision of the sliders can be suppressed to a higher extent.

The invention also aims to provide a linear motor of a shaft type, which can be used for driving, e.g., a reciprocatable slider carrying an optical part in the above image reading apparatus, and includes a stator in a rod-like form having a field magnet provided with N- and S-type magnetic poles arranged alternately, and a movable piece having an armature coil fitted around the stator and being reciprocatable along the stator, and more specifically aims to achieve the following objects.

Thus, still another object of the invention is to provide a linear motor, in which position detecting means such as a magnetic encoder is provided for detecting a position of a movable piece, and noises externally applied to the linear motor (e.g., a magnetic field outside the linear motor) may exert an influence on detection of the position of the movable piece by the position detecting means, and particularly a shaft-type linear motor, which can suppress the above influence to a substantially allowed level.

Yet another object of the invention is to provide a shaft-type linear motor, in which a magnetic field formed by a field magnet can efficiently act on an armature coil, and a movable piece can move smoothly along a stator while suppressing cogging.

Further another object of the invention is to provide a shaft-type linear motor, in which adhesion of dust or the like onto a stator is suppressed, and thereby it is possible to maintain a good sliding state between a movable piece and the stator for a long term.

The invention provides an image reading apparatus for optically scanning and reading an image on an original document laid at a predetermined position, including lighting means for lighting the original document, light turn-on means for turning on the lighting means, a plurality of optical part carrying sliders capable of linearly reciprocating in a predetermined direction and carrying said lighting means on one of said optical part carrying sliders, and position detecting means for detecting a position of the slider during reciprocation of the same, said position detecting means and said light turn-on means being spaced from each other and located at opposite sides of a center of a travel region of said sliders.

The invention also provides an image reading apparatus for optically scanning and reading an image on an original document laid at a predetermined position, including a plurality of sliders carrying optical parts and being capable of linearly reciprocating in a predetermined direction, position detecting means for detecting positions of said sliders during reciprocation of the same, and an operation panel having a liquid crystal display for displaying various kinds of information, the position detecting means and the operation panel being spaced from each other and located at opposite sides of a center of a travel region of said sliders.

The invention further provides a shaft-type linear motor including a rod-like stator having a field magnet provided with N- and S-type magnetic poles arranged alternately to each other, a movable piece having an armature coil fitted around said stator and being reciprocatable along said stator, and a yoke extending along the moving direction of said movable piece over at least an entire area of travel of said movable piece, fixed at the vicinity of an outer side of said movable piece and made of a ferromagnetic material.

The present invention still further provides a shaft-type linear motor including a shaft-type stator having a drive field magnet formed of a shaft member provided with N- and S-type magnetic poles arranged alternately in the longitudinal direction of said shaft member, and a movable piece having an armature coil, fitted around said stator and being reciprocatable along the longitudinal direction of said stator, wherein said shaft-type stator and the movable piece are covered with a protection cover, and said protection cover supports a portion of said stator at a position outside a range of travel of said movable piece, allows the reciprocation of said movable piece within said protection cover and has a window for coupling therethrough a driven member outside said cover to said movable piece.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5(A) shows a magnetic sensor signal detecting circuit of a linear encoder in the image scanner shown in FIG. 1, and FIGS. 5(B) to 5(E) show signal waveforms at different positions in the circuit shown in FIG. 5(A), respectively;

FIG. 10 is a schematic exploded perspective view of a movable piece in the linear motor shown in FIG. 7;

FIG. 12(A) is a schematic block diagram showing an example of an operation control circuit of a linear motor, FIG. 12(B) shows an example of current supply patterns to the coils of each phase, and FIG. 12(C) and FIG. 12(D) show current flowing directions at different positions shown in FIG. 12(B);

FIG. 21(A) is a schematic cross section of the linear motor shown in FIG. 1 taken along vertical plane with a cover unillustrated, FIG. 21(B) is a cross section taken along line A—A in FIG. 21(A), and FIG. 21(C) shows a distribution of magnetic flux of a field magnet;

DESCRIPTION OF THE PREFERRED EMBODIMENTS

Figure 1:
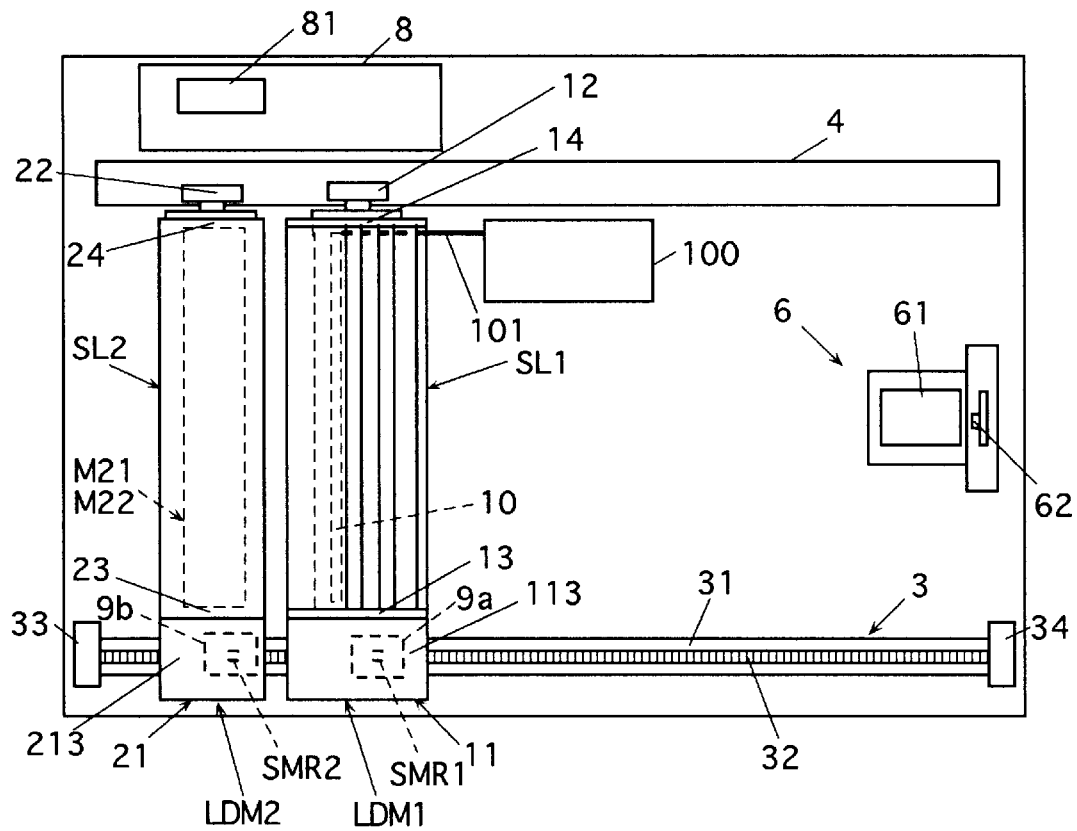
FIG. 1 is a schematic plan of an example of an image scanner according to the invention.

First and second image reading apparatuses will now be described below as preferred embodiments of the invention.

The first image reading apparatus is an apparatus for optically scanning and reading an image on an original document laid at a predetermined position, and includes lighting means for lighting the original document, light turn-on means for turning on the lighting means, a plurality of optical part carrying sliders capable of linearly reciprocating in a predetermined direction and carrying said lighting means on one of said optical part carrying sliders, and position detecting means for detecting positions of the sliders during reciprocation of the same. The position detecting means and the light turn-on means are spaced from each other and located at opposite sides of a center of a travel region of the sliders.

As an example of the above first image reading apparatus, an image reading apparatus, which is provided for optically scanning and reading an image on an original document laid at a predetermined position, may include lighting means for lighting the original document, light turn-on means for turning on the lighting means, a first slider capable of linearly reciprocating in a predetermined direction and carrying said lighting means and a mirror for leading image light beams reflected by the original document in a predetermined direction, a second slider capable of reciprocating in the same direction as the first slider and carrying mirrors for leading image light beams coming from the mirror on the first slider in a predetermined direction, first position detecting means for detecting the position of the first slider, and second position detecting means for detecting the position of the second slider. The first and second position detecting means are spaced from the light turn-on means with a center of a travel region of the sliders therebetween.

The second image reading apparatus is an apparatus for optically scanning and reading an image on an original document laid at a predetermined position, and includes a plurality of sliders carrying optical parts and being capable of linearly reciprocating in a predetermined direction, position detecting means for detecting positions of said sliders during reciprocation of the same, and an operation panel having a liquid crystal display for displaying various kinds of information. Said position detecting means and said operation panel are spaced from each other and located at opposite sides of a center of a travel region of said sliders.

As an example of this image reading apparatus, an image reading apparatus, which is provided for optically scanning and reading an image on an original document laid at a predetermined position, may include a first slider capable of linearly reciprocating in a predetermined direction and carrying lighting means for lighting the original document and a mirror for leading image light beams reflected by the original document in a predetermined direction, a second slider capable of reciprocating in the same direction as the first slider and carrying mirrors for leading the image light beams coming from the mirror on the first slider in a predetermined direction, first position detecting means for detecting the position of the first slider, and second position detecting means for detecting the position of the second slider. The first and second position detecting means are spaced from said operation panel with a center of a travel region of said sliders therebetween.

In either of the first and second image reading apparatuses, a focusing lens and one or more mirrors, which are operable to lead the image light beams onto a photosensitive member for forming an electrostatic latent image in an electrophotographic manner, may be arranged at a position on an optical axis of the reflected image light beams downstream to the mirror on the slider (e.g., second slider). Instead of the mirrors, an image sensor such as a CCD imaging element may be arranged downstream to the focusing lens on the above optical axis. The former can be applied to an image reading apparatus for a machine such as an analog copying machine. The latter may be applied to an image reading apparatus for a machine such as a digital copying machine, image scanner or the like.

In either of the first and second image reading apparatuses, the number, positions and directions of the reflection mirrors on the sliders are not restricted.

In either of the first and second image reading apparatuses, driving means for linearly reciprocating each slider in the predetermined direction may be selected from various kinds of means such as a linear motor or a rotary motor coupled to the slider through a transmission mechanism such as a wire-pulley mechanism.

In either of the first and second image reading apparatuses, the position detecting means may include a magnetic encoder scale stationarily arranged along the reciprocating direction of the slider, and a magnetism detecting element arranged on the slider for integral reciprocation and opposed to the encoder scale. The magnetism detecting element may be a MR element which is a kind of magnetoresistance element. In this case, the position detecting means usually further includes a detecting circuit for detecting an output of the magnetism detecting element. Therefore, the output signal (detected information) of the magnetism detecting element is usually supplied to the detecting circuit. The detecting circuit may include at least one of an amplifier circuit for amplifying the above input signal, a low-pass filer circuit for removing high-frequency component of the input signal, and a digitizing circuit for digitizing the input signal. The detecting circuit is preferably arranged near the magnetism detecting element. More specifically, in the first image reading apparatus, the magnetism detecting element and the detecting circuit are desirably spaced from the light turn-on circuit with a center of a travel region of the slider therebetween. In the second image reading apparatus, the magnetism detecting element and the detecting circuit are desirably spaced from the operation panel with a center of a travel region of the slider therebetween. The magnetism detecting element may be arranged on a circuit board on which the detecting circuit is formed. If the position detecting means is formed of the encoder including the magnetism encoder scale and the magnetism detecting element as described above, the detected information can be utilized for detecting the position of the slider, and can also be utilized for control of slider driving (e.g., position control and speed control).

In either of the first and second image reading apparatuses, the positions spaced from each other with the center of the travel region of the slider therebetween may be specifically positions at front and rear sides of the apparatus.

The lighting means in the first image reading apparatus may be typically a fluorescent lamp. If the lighting means is a fluorescent lamp, the light turn-on means may typically include an inverter circuit for turning on the fluorescent lamp.

In the first image reading apparatus, the position detecting means is arranged at a position remote from the light turn-on means (e.g., at the front side of the apparatus remote from the rear side). Therefore, in the foregoing structure wherein the position detecting means includes the magnetic encoder scale and the magnetism detecting element, the lighting means is the fluorescent lamp and the light turn-on means includes the inverter circuit, the magnetism detecting element (preferably, the magnetism detecting element and the above detecting circuit) is arranged at a position remote from the inverter circuit generating high frequency noises, so that the position detection by the magnetism detecting element is suppressed from being affected by the noises. This allows precise position detection. In this case, a cable for electrically connecting the fluorescent lamp and the lamp turn-on circuit is preferably connected to the fluorescent lamp through a position near the inverter circuit remote from the magnetism detecting element. Since this cable forms a source of high frequency noises, the above arrangement in which the connection cable is remote from the magnetism detecting element (preferably, the magnetism detecting element and the detecting circuit) can further suppress an influence by the noises exerted on the position detection by the magnetism detecting element.

In the second image reading apparatus, the position detecting means is arranged at the position remote from the operation panel (e.g., at the front side of the apparatus remote from the rear side). Therefore in the foregoing structure wherein the position detecting means includes the magnetic encoder scale and the magnetism detecting element as described above, the magnetism detecting element (preferably, the magnetism detecting element and the detecting circuit) is located at the position remote from the operation panel (e.g., at the front side of the apparatus remote from the rear side) which generates high frequency noises (particularly from its LCD and LCD drive circuit). Accordingly, the position detection by the magnetism detecting element is suppressed from being affected by the noises, which allows further precise position detection.

Such an image reading apparatus may be employed that includes a combination of the first and second image reading apparatuses, and in other words, such an image reading apparatus may be employed that is provided for optically scanning and reading an image on an original document laid at the predetermined position, and includes lighting means for lighting the original document, light turn-on means for turning on the lighting means, a plurality of optical part carrying sliders reciprocating linearly in a predetermined direction and carrying the lighting means on one of the sliders, position detecting means for detecting the positions of the sliders during reciprocation of the same, and an operation panel having an LCD displaying various kinds of information, and particularly that the position detecting means includes a magnetic encoder scale and a magnetism detecting element, the lighting means is the fluorescent lamp, and the light turn-on means includes an inverter circuit. In this case, the magnetism detecting element, the inverter circuit and the operation panel may be arranged as follows. The magnetism detecting element is spaced from the fluorescent lamp drive circuit and the operation panel with the center of the slider travel region therebetween. Similarly to the former case, the detecting circuit is desirably arranged near the magnetism detecting element and arranged with respect to the inverter circuit and the operation panel to establish the same positional relationship as that described above. For example, the operation panel is arranged at the front position of the apparatus for easy operation. The inverter circuit for turning on the fluorescent lamp is also arranged at the front position of the apparatus. The magnetism detecting element (more preferably, together with the detecting circuit) is arranged at the rear position of the apparatus. Thereby, the foregoing relationship can be satisfied.

Image reading apparatuses of preferred embodiment of the invention will be described below with reference to FIGS. 1 to 6.

Figure 2:
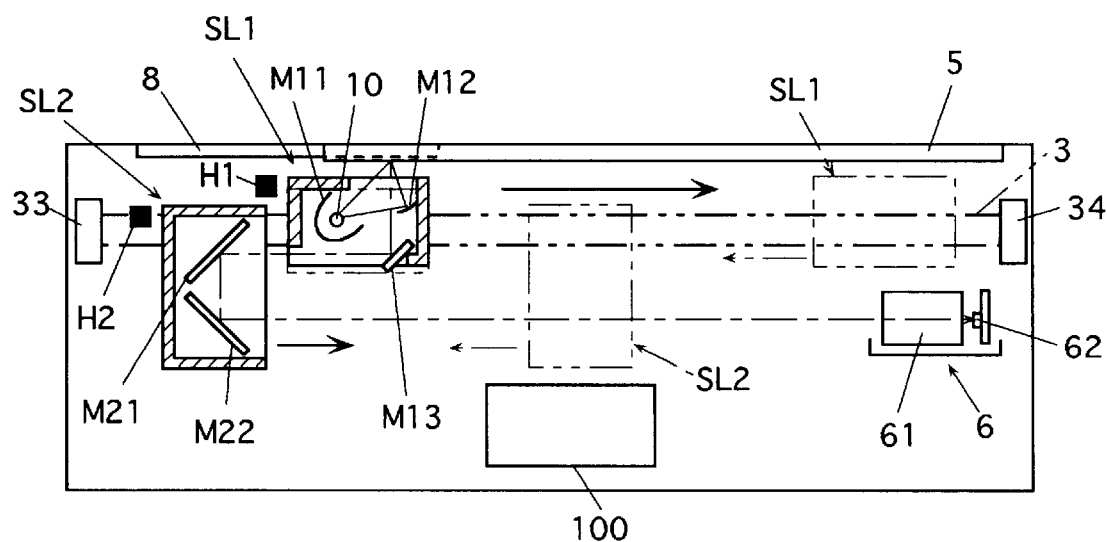
FIG. 2 is a schematic side view showing the image scanner in FIG. 1 with a certain part cut away.
Figure 3:
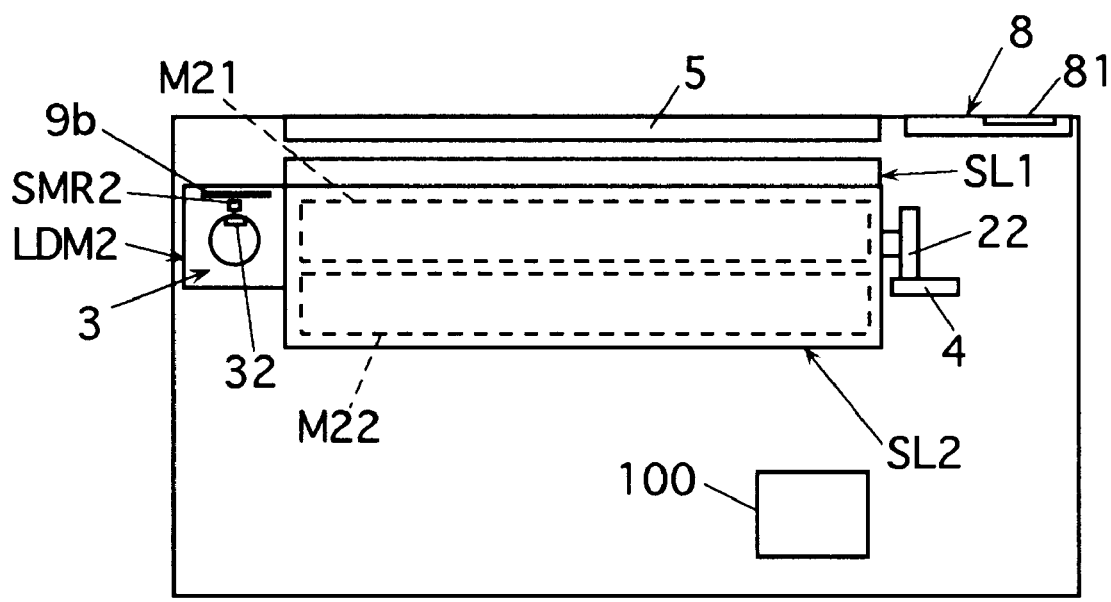
FIG. 3 is a schematic elevation of the image scanner shown in FIG. 1.

FIGS. 1 to 3 show an example of an image scanner according to the invention. More specifically, FIG. 1 is a schematic plan of the scanner, FIG. 2 is a schematic side view of the same with a certain part cut away, and FIG. 3 is a schematic elevation of the same. An original document table glass is not shown in FIG. 1.

In the following description, the upper side in FIG. 1 and the right-hand side in FIG. 3 are expressed as the front side, i.e., the side near an operator, and the lower side in FIG. 1 and the left-hand side in FIG. 3 are expressed as the rear side, i.e., the side remote from the operator.

Figure 6:
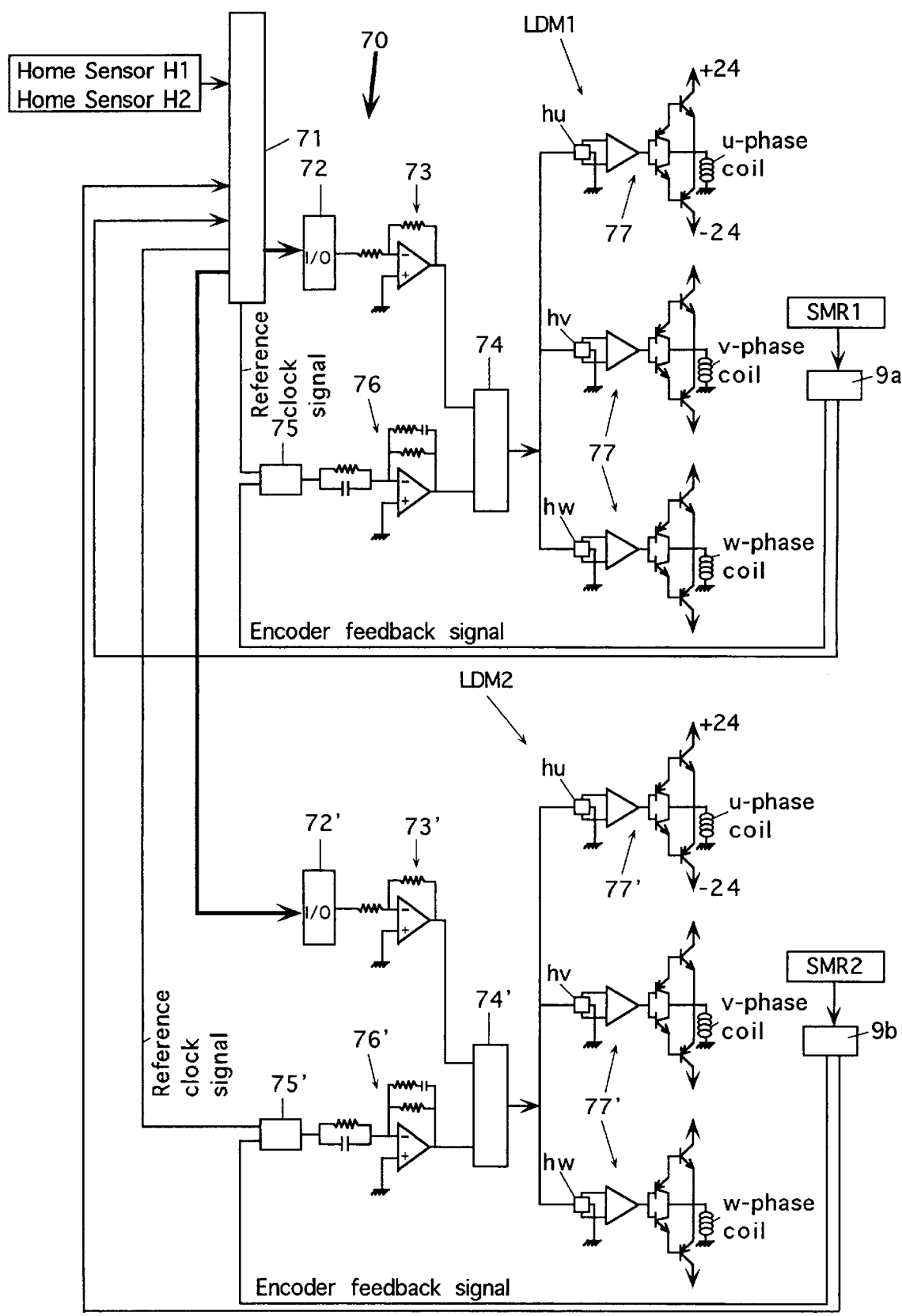
FIG. 6 is a circuit diagram of a control unit of the linear motor in the image scanner shown in FIG. 1.

The image scanner has an original document table glass 5, first and second sliders SL1 and SL2 capable of reciprocating along a rod-like stator 3 and a guide rail 4 which are arranged under the original document table glass 5, a reading unit 6, an operation panel 8, a light drive or turn-on circuit 100 for turning on a fluorescent lamp 10 carried on the first slider SL1, and a control unit 70 (see FIG. 6).

The operation panel 8 has a liquid crystal display (LCD) 81 for displaying various kinds of information, and is arranged at the front side of the image scanner. A drive circuit (not shown) for the LCD 81 is arranged at the same side.

The first slider SL1 carries the fluorescent lamp 10 for lighting the original document laid on the original document table glass 5, reflection mirrors M11 and M12 for directing the light beams issued from the fluorescent lamp 10 toward the original document, and a reflection mirror M13 for leading the reflected light beams coming from the original document toward the second slider SL2.

A light turn-on circuit 100 which includes inverter circuit for the fluorescent lamp 10 and carried on the first slider SL1 is arranged at the front side of the image scanner. A power supply cable 101 electrically connecting the light turn-on circuit 100 to the fluorescent lamp 10 is connected to the fluorescent lamp 10 through a front position in the image scanner.

The second slider SL2 carries reflection mirrors M21 and M22 for leading the original image light beams led from the reflection mirror M13 to the reading unit 6.

The reading unit 6 includes a lens 61 and a CCD 62 which is an imaging element. The lens 61 focuses the image light beams, which are led by the reflection mirrors M21 and M22 on the second slider SL2, onto the CCD 62. This reading unit 6 is fixed to the apparatus by carrying means (not shown).

The first slider SL1 has a constant width in the direction perpendicular to its travelling direction, and has an end 13 fixed to a movable piece yoke 113 of a movable piece 11. The first slider SL1 is provided at the other end 14 with a support roller 12 which can travel on the guide rail 4 parallel to the stator 3.

The movable piece 11 is one of components of a linear motor LDM1 which is drive means of the first slider SL1. The stator 3 also forms a component of the linear motor LDM1. The movable piece 11 is reciprocatably fitted around the stator 3.

Similarly to the first slider SL1, the second slider SL2 has a constant width in a direction perpendicular to its travelling direction, and has an end 23 fixed to a movable piece yoke 213 of a movable piece 21. The second slider SL2 is provided at the other end 24 with a support roller 22, which can travel on the guide rail 4 parallel to the stator 3. The movable piece 21 forms one of components of a linear motor LDM2 which is drive means of the second slider SL2. The movable piece 21 is reciprocatably fitted around the stator 3 which is commonly used by the motor LDM1.

The stator 3 which is commonly used by both the motors LDM1 and LDM2 is formed of a rod member, which has a smooth surface and a circular section. This rod member is made of a machinable and magnetizable material (MnAl in this embodiment), and is provided with a field magnet 31 and a magnetic scale 32. The stator 3 thus formed is supported at its opposite ends by holder members 33 and 34 made of a nonmagnetic material, and is arranged parallel to the original document table glass 5 at the rear position of the image scanner.

Figure 4A:
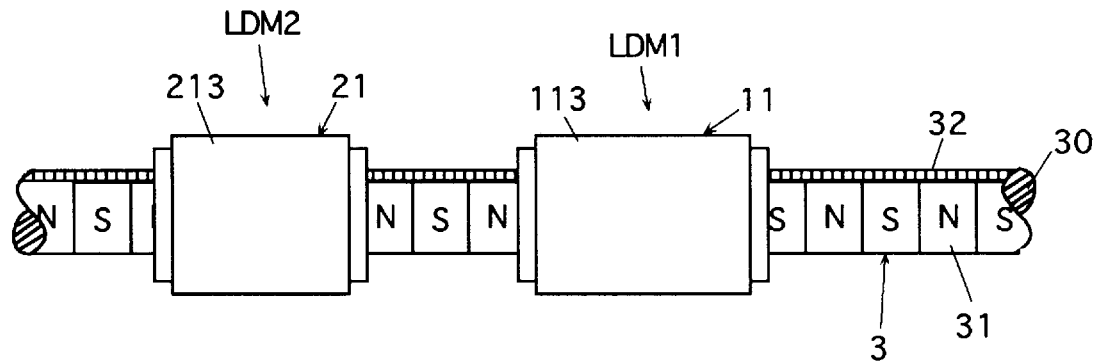
FIG. 4(A) is a side view of a linear motor forming first and second slider driving means in the image scanner shown in FIG. 1.

The field magnet 31 is formed on a rod member 30, and is provided, as shown in FIG. 4(A), at its surface with N- and S-type magnetic poles arranged alternately to each other in the longitudinal direction thereof with a pitch of 30 mm. The field magnet 31 provides a distribution of magnetic force, which has a peak of 1500 gauss and shows a sinusoidal curve with a cyclic period of 60 mm.

Figure 4B:
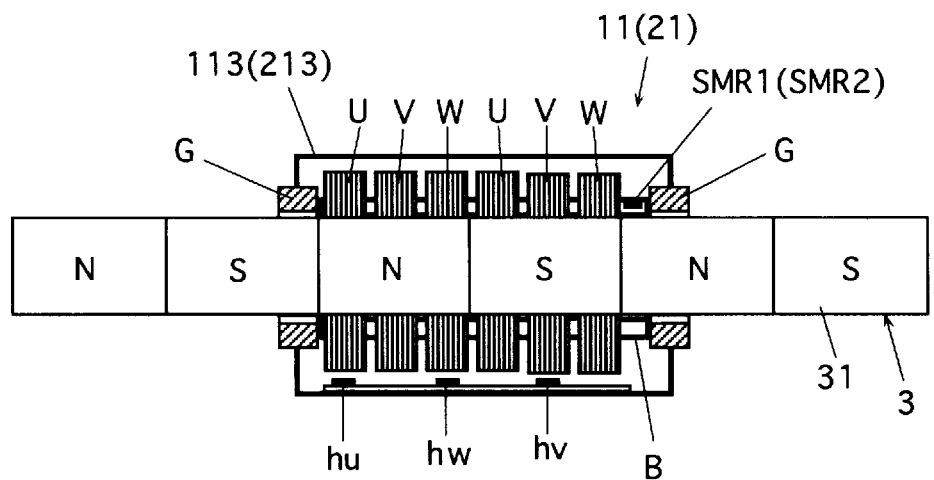
FIG. 4(B) shows a section of the linear motor.

The movable pieces 11 and 21 of the motors LDM1 and LDM2 have the substantially same structure, although various parts have different sizes or the like. More specifically, as shown in FIG. 4(B), the movable piece 11 (21) has a coil bobbin B which is fitted around the stator 3, and also has three-phase armature coils U, V and W which are arranged around the bobbin B and are formed of u-, v- and w-phase coils, respectively. These coils U, V and W are covered with a movable piece yoke 113 (213). These armature coils performs motor driving in a three-phase driving manner and, for this purpose, are arranged at positions shifted from each other by an electric angle of $2\pi/3$ (or positions of the same phases as those shifted from each other by an electric angle of $2\pi/3$). Annular guide members G fitted around the stator 3 are arranged at the opposite ends of the movable piece yoke 113 (213) and the coil bobbin B. Sensors are arranged at the inner surface of the movable piece yoke 113 (213) for detecting positions of the coils with respect to the field magnet 31 and thereby controlling the current supply in accordance with the positions of the coils so as to produce a driving force independently of the position of the movable piece, respectively. In this embodiment, a Hall element hu is arranged as the position detecting sensor for the u-phase coil. Likewise, Hall elements hv and hw are arranged for v- and w-phase coils, respectively.

Magnetic sensors are arranged on the coil bobbin B for reading magnetic information from the magnetic scale 32. More specifically, a magnetic sensor SMR1 is provided for the motor LDM1, and a magnetic sensor SMR2 is provided for the motor LDM2. The magnetic sensor SMR1 (SMR2) for reading the magnetic information from the magnetic scale 32 is a sensor called an MR sensor utilizing a magnetoresistance element in this embodiment, although not restricted thereto. The sensors SMR1 and SMR2 are arranged at positions on the movable piece yoke 113 and 213 opposed to the magnetic scale 32, respectively.

Figure 4C:
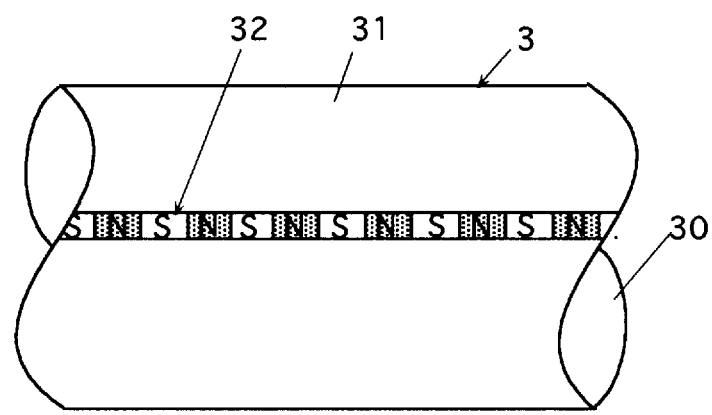
FIG. 4(C) is a plan showing, on an enlarged scale, a magnetic scale on a stator of the linear motor.

As shown in FIG. 4(C), the magnetic scale 32 is formed by effecting fine magnetization on the stator 3 to provide N- and S-type magnetic poles alternately in the longitudinal direction of the stator 3. In this embodiment, the magnetic pole pitch is 200 $\mu$m, and the magnetic force distribution represents a sinusoidal form.

For the motor LDM1, the magnetic scale 32 and the magnetic sensor SMR1 form a magnetic linear encoder of an increment type. For the motor LDM2, the same magnetic scale 32 and the magnetic sensor SMR2 form a magnetic linear encoder of an increment type. The home positions of the first and second sliders SL1 and SL2 (movable pieces 11 and 21) are detected by home sensors H1 and H2 shown in FIG. 2, respectively. The detection signals of the home sensors H1 and H2 are supplied to an input port of a computer 71 which will be described later. By the encoder and the home sensor, it is possible to detect the position of the movable piece 11 (21) with respect to the stator 3 and thus the position of the slider SL1 (SL2). As will be described later, the detected informations of the magnetic sensors SMR1 and SMR2 are utilized also for speed control of the movable pieces 11 and 21, respectively.

Each magnetic sensor SMR1 (SMR2) detects variation of magnetism produced from the S- and N-poles of the magnetic scale 32 in accordance with travel of the movable piece 11 (21). The detected variation of magnetism or detected signal shows a sinusoidal form in this embodiment, therefore the signal detected by magnetic sensor SMR1 (SMR2) provides the position information by converting the same into a square wave form and thereafter digitizing. The signal including position information output from the magnetic sensor SMR1 (SMR2) is supplied to the magnetic signal detecting circuit 9a (9b), which will be described below. The output signal of the circuit 9a (9b) is sent to a control unit 70, which will be described later. The detecting circuit 9a is provided for the sensor SMR1, and the detecting circuit 9b is provided for the sensor SMR2. The detecting circuits 9a and 9b are arranged near the sensors SMR1 and SMR2, respectively. The sensors SMR1 and SMR2 may be arranged on the same circuit boards as the detecting circuits 9a and 9b, respectively.

FIG. 5(A) shows the magnetic signal detecting circuit 9a (9b) connected to the magnetic sensor SMR1 (SMR2). The detecting circuits 9a and 9b have the same circuit structures. Signal waveforms at various positions in the circuit shown in FIG. 5(A) are shown in FIGS. 5(B)–5(E). The circuit 9a (9b) is formed of an amplifier 91, a low-pass filter 92, a comparator 93 and a waveform shaper 94. Although not fully shown, the circuit 9a (9b) is provided with capacitors and coils for removing power source noises at ±12-volt lines and ±5-volt lines.

The amplifier 91 receives a signal (see FIG. 5(B)) produced by magnetoelectrically converting the magnetic information of the magnetic scale 32 which is obtained by the magnetic sensor SMR1 (SMR2) in accordance with travel of the movable piece 11 (21). The received signal is a sinusoidal voltage signal, because the magnetic scale 32 is magnetized in a sinusoidal form. This signal is amplified by the amplifier 91, because it is an extremely weak signal. The amplified signal (see FIG. 5(C)) is liable to be affected by noises and often contains high frequency components, because it is produced from the extremely weak signal and is an analog signal. Therefore, the low-pass filter 92 removes the high frequency component. The signal (see FIG. 5(D)) from which the high frequency component is removed is converted into a square waveform by the comparator 93, and the converted signal is shaped by the waveform shaper 94. The signal thus processed is sent to the input port of the computer 71, which will be described later. This signal (see FIG. 5(E)) is in synchronization with the input signal (see FIG. 5(B)) sent into the detecting circuit 9a (9b).

The linear motors LDM1 and LDM2 described above produce driving forces when electric currents are flowed through the armature coils of the movable pieces 11 and 21 under the control of the controller 70, so that the movable pieces 11 and 21 move along the stator 3, and thereby the sliders SL1 and SL2 move, respectively.

The control unit 70 includes the microcomputer 71 for instructing predetermined operations of the motors LDM1 and LDM2 and issuing a reference clock signal to the phase lock controllers 75 and 75', and also includes I/O ports 72 and 72' of the computer 71, amplifiers 73 and 73', switching units 74 and 74', the phase lock controllers 75 and 75', compensating circuits 76 and 76', and amplifier circuits 77 and 77'.

According to the control circuit shown in FIG. 6, the computer 71 supplies the reference clock signals corresponding to an intended speeds of the movable piece 11 and 21 to the phase lock controllers 75 and 75', and the encoders including the magnetic sensors SMR1 and SMR2 feed back the travel speed signals of the movable piece 11 and 21 to the controllers 75 and 75' through the detecting circuits 9*a* and 9*b*, respectively. The phase lock controllers 75 and 75' issue signals corresponding to differences in frequency and phase between the pulses of the reference clock and the fedback signals sent from the encoders. The compensating circuits 76 and 76' compensate a delay or lead in the transmission system, and issue the output voltages which are used as the reference input voltages of the Hall elements. Each Hall element issues a voltage corresponding to a magnitude and a direction of magnetic flux at the position of the same. The Hall element issues a voltage further proportional with the reference input voltage owing to its own characteristics. Therefore, the Hall element issues the output voltage corresponding to the differences in frequency and phase between the reference clock signal and the feedback signal. The output voltage of the Hall element is proportionally amplified by the amplifier circuit 77 or 77', and is supplied to the corresponding armature coil. In this manner, the frequency and phase of the feedback signal are synchronized with those of the reference clock signal, and in other words, the motors LDM1 and LDM2 are driven to attain intended or target speeds of the movable pieces 11 and 21, respectively. During image scanning, a speed ratio between the sliders SL1 and SL2 is set to 2:1.

According to the image scanner of the invention described above, the detecting circuits 9*a* and 9*b* and the magnetic sensors SMR1 and SMR2 of the liner encoders for obtaining position information of the sliders SL1 and SL2 are arranged at the front side of the apparatus, and thus are remote from the fluorescent lamp turn-on circuit 100 and the LCD 81 which are located at the rear side of the apparatus and may form noise sources generating high frequency noises. Therefore, the detecting circuits 9*a* and 9*b* and the magnetic sensors SMR1 and SMR2 are suppressed from being influenced by the noises to a practically allowed extent, so that the position detection can be performed accurately. Thereby, better image reading can be performed, and the possibility of runaway and collision of each slider can be suppressed.

Depending on distances from the fluorescent lamp turn-on circuit 100 and the LCD 81 to the magnetic sensors SMR1 and SMR2 and the detecting circuits 9*a* and 9*b*, a low-pass filter 92 shown in FIG. 5(A) may be eliminated from the magnetic sensor signal detecting circuit 9*a* (9*b*), or the capacitors and/or coils (not shown) for removing power source noises may be reduced in number. This reduces a cost and sizes of the scanner.

Although the image scanner has been discussed as an example of the invention, the invention may be applied to another apparatus such as a copying machine equipped with an image reading apparatus.

As the driving means for driving each slider, other than the linear motor may be employed, for example, a rotary motor and a transmission mechanism such as a wire-pulley mechanism for transmitting the power of the rotary motor may be employed.

Description will now be given on shaft-type linear motors, which can be employed in the image reading apparatus of the invention already described for driving the sliders SL1 and SL2, and allows more precise detection of the positional information of these sliders by further suppressing an influence by high frequency noises from the fluorescent lamp turn-on circuit 100 and the LCD 81.

(2) Shaft-Type Linear Motor

The shaft-type linear motor may include a rod-like stator having a field magnet provided with N- and S-type magnetic poles arranged alternately to each other, a movable piece having an armature coil fitted around the stator and being reciprocatable along the stator, and a yoke extending along the moving direction of the movable piece over at least an entire area of travel of the movable piece, fixed at the vicinity of an outer side of the movable piece and made of a ferromagnetic material.

There may be arranged a linear encoder for detecting the position of the movable piece. The linear encoder may be of either an optical type or a magnetic type. There may also be arranged home position detecting means for detecting a home position of the movable piece.

The section of the rod-like stator perpendicular to the longitudinal direction of the stator may be typically circular, and alternatively may be of another polygonal shape such as a triangle, square or pentagon. The armature coil fitted around the stator has a section perpendicular to the longitudinal direction of the stator, which may typically be circular, and alternatively may be of another polygonal shape such as a triangle, square or pentagon.

The yoke extending along the travel direction of the movable piece may have a plate-like form or a cylindrical form having, e.g., a circular section, a square section or another polygonal section, or may be formed of a member (having, e.g., a semicircular section) prepared by removing a portion of a cylindrical member. For the reason which will be described later, this yoke is preferably arranged as near as possible to the field magnet of the stator, and in other words, is preferably arranged as near as possible to the movable piece having the armature coil fitted around the stator. Therefore, it is preferable that the section of the yoke perpendicular to the longitudinal direction of the stator has a shape which is similar to the sectional shape of the movable piece. In other words, it is preferable that the inner periphery of the section of the yoke perpendicular to the longitudinal direction of the stator is similar in shape to the outer periphery of the section of the movable piece (particularly, the armature coil) perpendicular to the longitudinal direction of the stator. The yoke is made of a ferromagnetic material such as iron, silicon steel, cobalt or nickel.

According to the above linear motor, when the armature coil of the movable piece is energized, a force is exerted on the armature coil owing to an interaction between the current flowing through the armature coil and the magnetic field formed by the field magnet through the armature coil, so that the movable piece moves in the longitudinal direction of the stator. The movable piece moves in the longitudinal direction of the rod-like stator. The yoke, which is made of a ferromagnetic material extending along the travel direction of the movable piece (longitudinal direction of the stator), is opposed to the field magnet of the stator with the armature coil of the movable piece therebetween. In the above operation, therefore, the magnetic field formed by the field magnet tends to form a magnetic loop through the yoke, and the magnetic field acting on the armature coil inside the yoke has a larger intensity than that in the case where the yoke is not employed, so that the linear motor can produce a larger driving force. In other words, the magnetic field formed by the field magnet can act more efficiently on the armature coil owing to provision of the yoke. As the distance between the field magnet and the yoke and thus the distance between the movable piece and the yoke decrease, the magnetic field formed by the field magnet can act on the armature coil more efficiently. If the yoke were moved together with the movable piece, cogging would occur due to variation in the magnetic attractive force exerted on the yoke by the field magnet. In the linear motor described above, however, the yoke is stationarily arranged, so that the magnetic attractive force exerted by the field magnet on the yoke does not vary, so that cogging can be prevented. This allows the movable piece to move more smoothly along the stator.

The following structure may be employed for preventing adhesion of dust or the like onto the stator and thereby ensuring smooth movement of the movable piece along the stator for a long term, and for suppressing noise influences exerted internally and externally with respect to the yoke.

The yoke having a hollow cylindrical form is employed, and the stator and the movable piece are arranged inside the yoke. The yoke is provided with a window through which a driven member outside the yoke is coupled to the movable piece. According to this structure, outer surfaces of the stator and the movable piece are substantially entirely covered by the yoke, so that adhesion of dust or the like to the stator can be suppressed. In this structure, the yoke functions also as a cover. Further, the yoke made of a ferromagnetic material and having the above form can suppress noises (e.g., magnetic influences) applied internally and externally with respect to the yoke. In this structure, such a specific structure may be employed that the movable piece is provided with an attachment member for attaching the driven member outside the yoke to the movable piece. This attachment member projects outward from the yoke through the window in the yoke, and the window has a long form extending in the travel direction of the movable piece and entirely covering the travel area of the attachment member which reciprocates together with the movable piece. In order to suppress entry of dust or the like through the window, a window cover(s) may be employed for covering a portion in the window other than the attachment member. The window cover may be extensible to allow expansion and shrinkage in accordance with reciprocation of the attachment member, and may be of a bellows type. The window cover may include an electric power supply cable for driving the movable piece. In any case, the opposite ends of the cylindrical yoke are desirably covered by covers, and, for example, may be covered by supporting members which support portions of the stator at positions other than the travel area of the movable piece. In this structure, the stator, movable piece, yoke and covers may be integrated to allow handling as one unit. This is advantageous from the view point of transportation, storage, installation and others.

The yoke may be an assembly formed of two or more independent parts for easy and efficient assembling operation. In this case, the independent parts of the yoke are joined together, e.g., by screws, fitting or adhesive.

The above driven member may be a slider carrying an optical part or device for optically scanning and reading an image in an image reading apparatus which is employed, for example, in a copying machine or an image scanner, although not restricted thereto.

Preferred embodiments of the linear motors will now be described below with reference to FIGS. 7 to 18.

Figure 7:
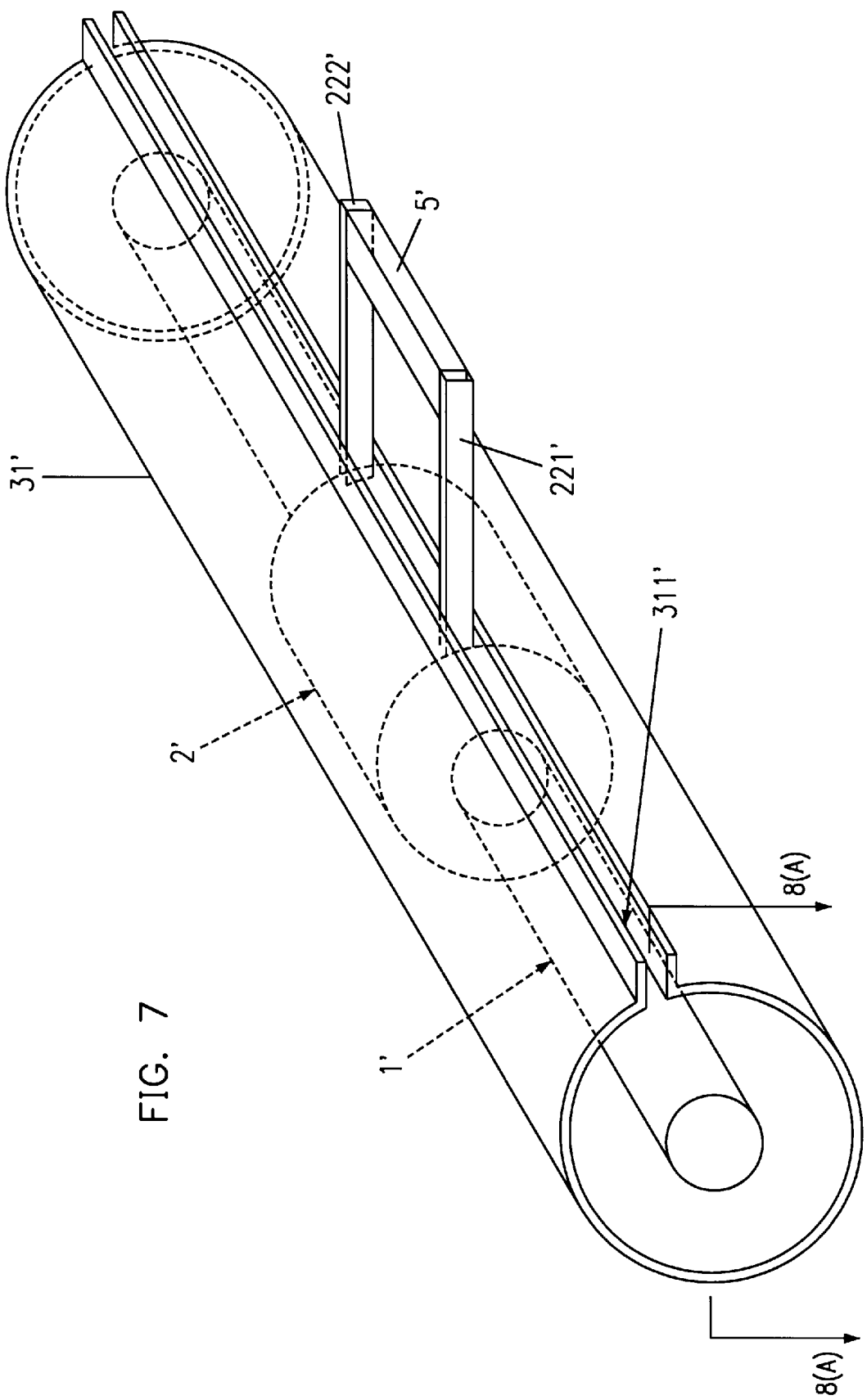
FIG. 7 is a schematic perspective view of an example of a linear motor according to the invention with a certain part removed.

FIG. 7 is a schematic perspective view of an example of the linear motor according to the invention with a certain part removed.

This linear motor has a linearly extending rod-like stator 1', a movable piece 2' fitted around the stator 1', and a hollow and cylindrical yoke 31' extending along the entire length of the stator 1' and covers substantially entirely the stator 1' and the movable piece 2'. In this embodiment, the yoke 31' functions also as a cover as will be described later.

As will be described later more in detail, the movable piece 2' is reciprocatable along the stator 1', and a driven member is attached to the movable piece 2'. Therefore this linear motor can be used for reciprocating the driven member linearly in the longitudinal direction of the stator 1'. The driven member may be a slider carrying an optical part for optically reading an image in an image reading apparatus employed, for example, in a copying machine or an image scanner. As will be described later more in detail, the yoke 31' is provided with a window 311' extending entirely through a travel area of the movable piece 2' and communicating the inner and outer sides of the yoke 31' with each other for attaching the driven member to the movable piece 2'. Support members 221' and 222' extend outward from the yoke 31' through the window 311'. The support members 221' and 222' form components of the movable piece 2', and support an attachment member 5' for attaching the driven member.

Figure 8A:
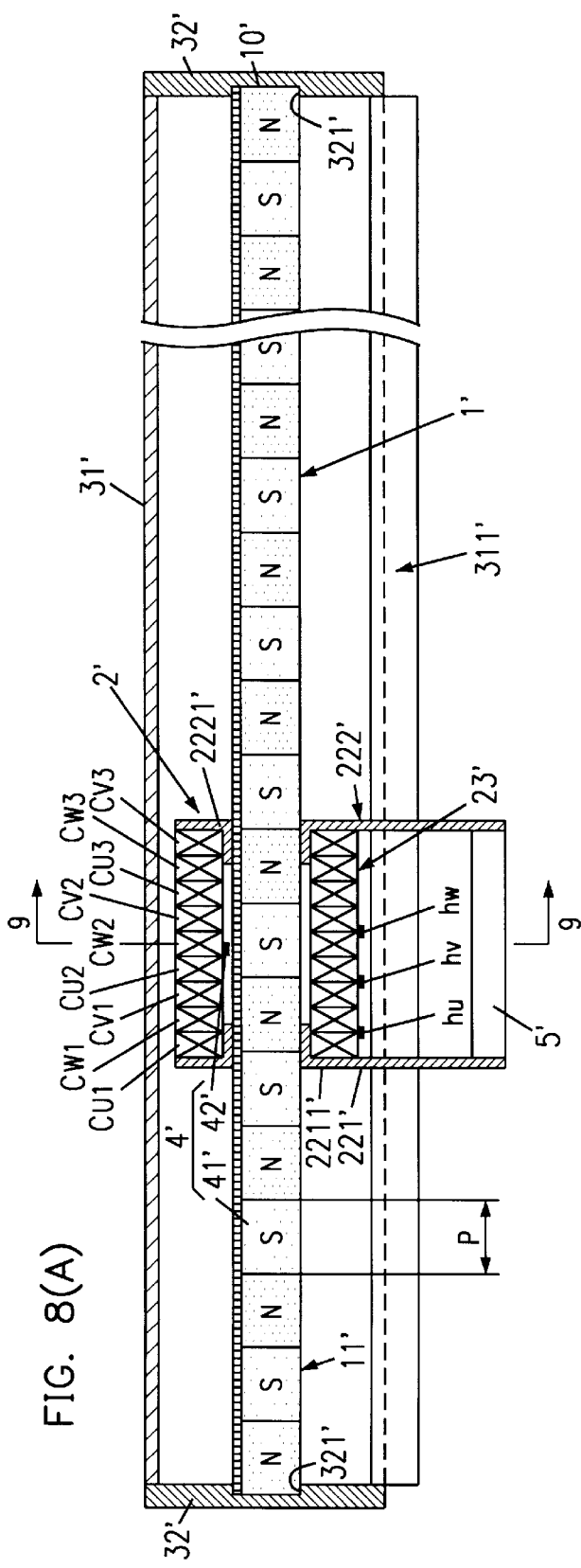
FIG. 8(A) is a schematic cross section of the linear motor taken along line A—A in FIG. 7.

The stator 1', movable piece 2' and yoke 31' will be described below more in detail with reference to FIGS. 8(A), 8(B), 9 and 10. FIG. 8(A) is a schematic cross section taken along line A—A in FIG. 7. FIG. 9 is a schematic cross section taken along line B—B in FIG. 8(A). FIG. 10 shows a schematic exploded perspective view of the movable piece.

Figure 11A:
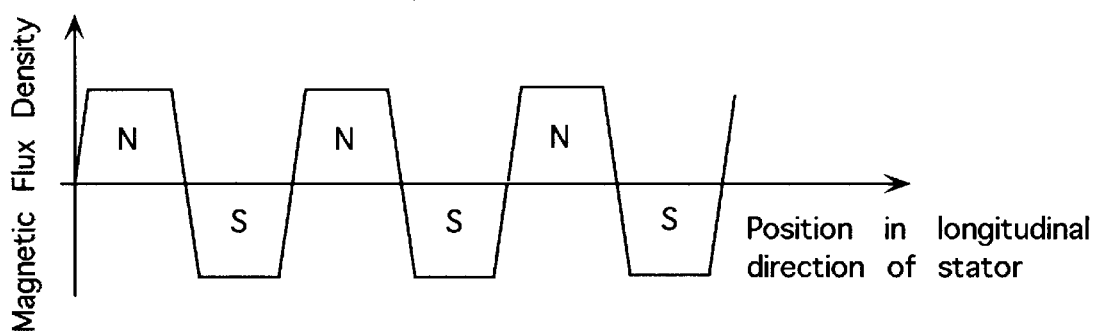
FIG. 11(A) shows an example of distribution of magnetic flux formed by a field magnet.
Figure 11B:
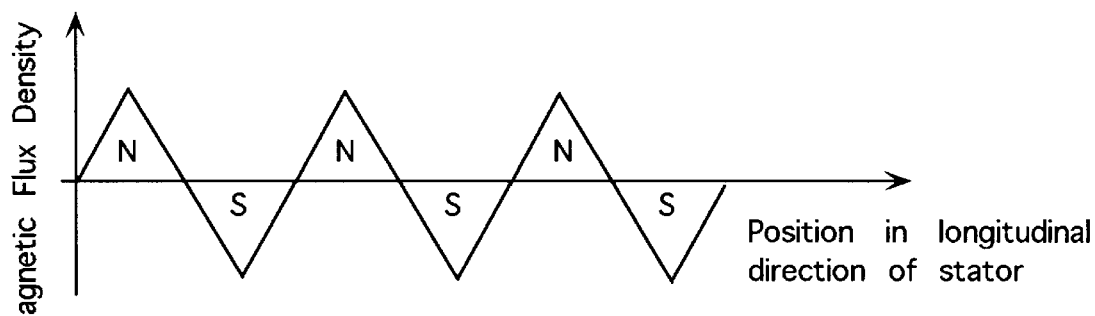
FIG. 11(B) shows another example of distribution of magnetic flux.
Figure 11C:
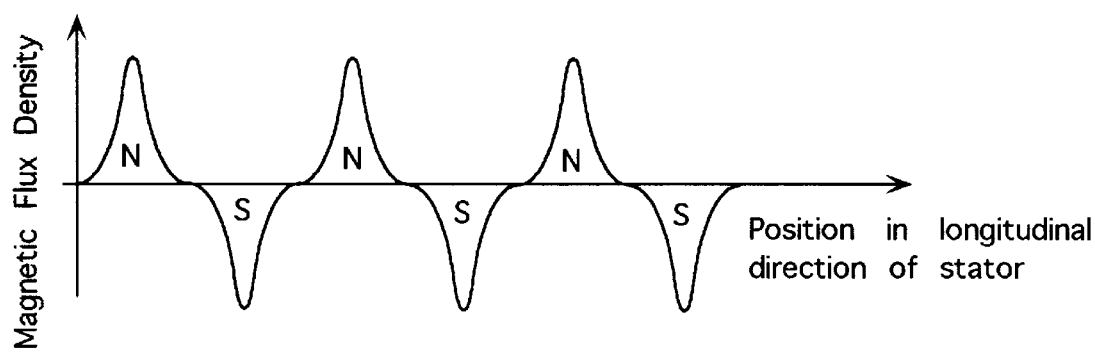
FIG. 11(C) shows still another example of distribution of magnetic flux.

The stator 1' is formed of a shaft member 10', which is made of a machinable and magnetizable material (e.g., Fe—Cr—Co contained metal, or Mn—Al) and has a machined smooth surface. In this embodiment, the shaft member 10' has a circular cross section. The shaft member 10' is magnetized to form a field magnet 11', which provides a magnetic flux distribution of a substantially trapezoidal waveform with an equal pitch along the longitudinal direction of the shaft member 10' (i.e., longitudinal direction of the stator 1') as shown in FIG. 11(A), and is provided with N- and S-type magnetic poles alternately arranged along the longitudinal direction of the shaft member 10'. A magnetic pole pitch P (a pitch in the longitudinal direction of the stator 1') of the N- and S-type magnetic poles on the field magnet 11' is 30 mm in this embodiment. The magnetic flux distribution along the longitudinal direction of the stator may have a form other than that shown in FIG. 11(A). For example, it may have a triangular wave form as shown in FIG. 11(B), or a sinusoidal form as shown in FIG. 11(C). The shaft member 10' is further provided with an encoder chart 41' forming a part of an encoder provided for position detection, position control and speed control of the movable piece 2'. In this embodiment, the encoder chart 41' is of a magnetic type, is provided with N- and S-type magnetic poles arranged alternately with an equal pitch in the longitudinal direction of the shaft member 10', and is superposed on the field magnet 11'. The N- and S-type magnetic poles of the encoder chart 41' are arranged with a pitch of 100 μm in this embodiment.

The stator 1' is supported at its opposite ends by circular cover members 32' (not shown in FIG. 7) which cover openings at the longitudinally opposite ends of the yoke 31', respectively. More specifically, each circular cover member 32' is provided at its center with a circular groove 321', into which the end of the stator 1' is fitted so that the stator 1' is carried and located at the center of the yoke 31'. Cover member 32' may have an aperture, instead of the groove 321', into which the end of the stator 1' is fitted.

The movable piece 2' will be now described below.

The movable piece 2' has an armature coil 23' fitted around the stator 1'. In this embodiment, the armature coil 23' is formed of windings of electric wire in circular ring forms, i.e., coils $C_{U1}$, $C_{V1}$, $C_{W1}$, $C_{U2}$, $C_{V2}$, $C_{W2}$, $C_{U3}$, $C_{V3}$ and $CW_3$. The coils $C_{U1}$, $C_{V1}$ and $C_{W1}$ are located at positions equivalent to the positions shifted by a phase angle of $2\pi/3$ radian from each other, where the phase angle of $2\pi$ radian corresponds to a distance between adjacent N-type and S-type magnetic poles on the field magnet 11' in the longitudinal direction of the stator. The same is true with respect to the coils $C_{U2}$, $C_{V2}$ and $C_{W2}$, and with respect to the coils $C_{U3}$, $C_{V3}$ and $C_{W3}$. Thus, these three coils in each set are located at positions equivalent to the positions shifted by a phase angle of $2\pi/3$ radian from each other. In this embodiment, each of these coils has a width equal to ⅓ of the magnetic pole pitch P, and these coils are arranged in the longitudinal direction of the stator in such an order as follows. The coils $C_{U1}$, $C_{W1}$ and $C_{V1}$ are followed by the coils $C_{U2}$, $C_{W2}$ and $C_{V2}$, which are followed by the coils $C_{U3}$, $C_{W3}$ and $C_{V3}$. These coils are shifted from each other by P/3 in the longitudinal direction of the stator. As described above, the armature coil 23' in this embodiment has three sets of coils, each set including three coils at positions equivalent to the positions shifted from each other by the phase angle of $2\pi/3$ radian, and forming a set of three-phase coils. The motor may employ only one set of three-phase coils, and alternatively may employ two or more (three in this embodiment) sets of three-phase coils. The driving force increases proportionally to the number of the set of the three-phase coils.

Figure 8B:
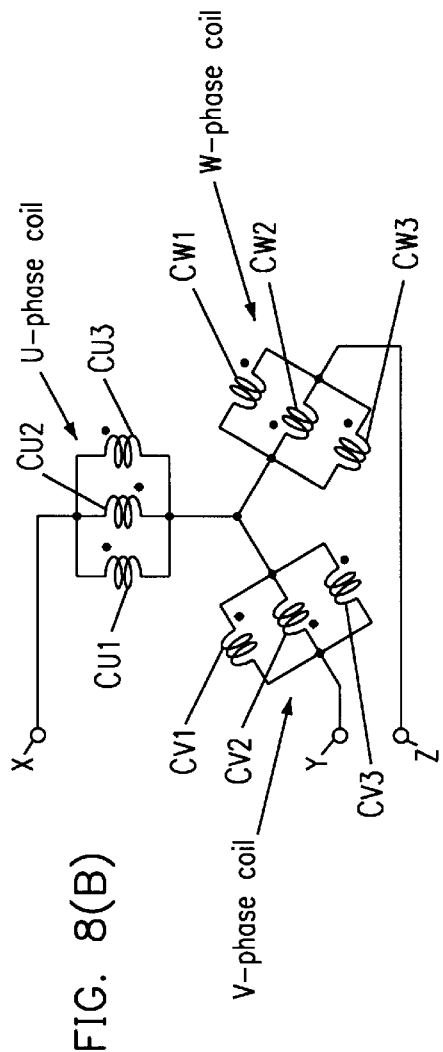
FIG. 8(B) shows connection state of coils.
Figure 9:
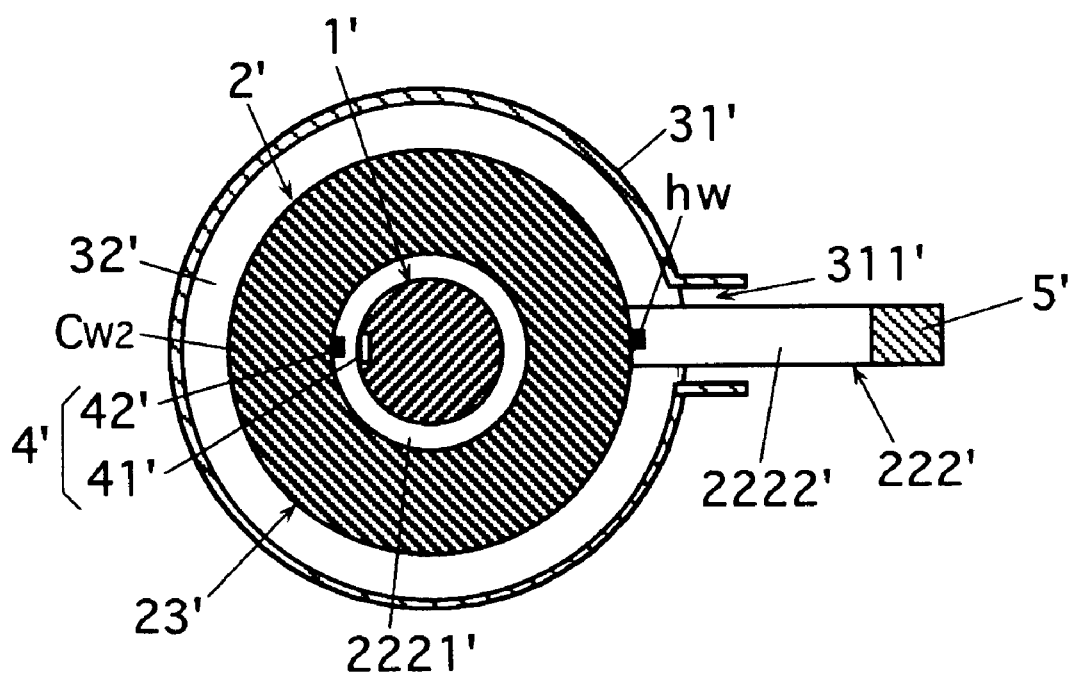
FIG. 9 is a schematic cross section of the linear motor taken along line B—B in FIG. 8(A)

These coils are star-connected as shown in FIG. 8(B). More specifically, the coils $C_{U1}$, $C_{U2}$ and $C_{U3}$, which will be referred to as U-phase coils, are connected in parallel, and the winding direction of the coil $C_{U2}$ is opposite to those of the other two coils. Likewise, the coil $C_{V1}$, $C_{V2}$ and $C_{V3}$, which will be referred to as V-phase coils, are connected in parallel, and the winding direction of the coil $C_{V2}$ is opposite to those of the other two coils. The coil $C_{W1}$, $C_{W2}$ and $C_{W3}$, which will be referred to as W-phase coils, are connected in parallel, and the winding direction of the coil $C_W$ is opposite to those of the other two coils. The coil $C_{U1}$ is wound in the same direction as the coil $C_{V1}$, and the coil $C_{W1}$ is wound in the direction opposite to those of these two coils. These U-, V- and W-phase coils are star-connected as shown in FIG. 8(B). Marks "●" beside these coils shown in FIG. 8(B) show the differences of the winding directions of these coils. For example, when a voltage is applied between terminals X and Y, thereby an electric current flows through the U- and V-phase coils, the directions of the currents flowing through the coils $C_{U1}$, $C_{U3}$, $C_{V1}$, and $C_{V3}$ are the same, and those of the other coils, i.e., the coils $C_{U2}$ and $C_{V2}$ are opposite.

These coils are adhered and fixed together to provide the above positional relationship and winding directions (see FIG. 10). The supporting members 221' and 222' made of a nonmagnetic material are fitted to the opposite ends of the assembly of the coils (armature coil 23') thus adhered and fixed. More specifically, as shown in FIG. 10, the supporting member 221' has a circular plate 2213' provided at its center with an aperture 2214', and also has a plate-like projection 2212' projected integrally and radially from the circular plate 2213'. The supporting member 221' further has a cylindrical projection 2211' which has an inner diameter equal to the diameter of the aperture 2214' and projects in the direction of the thickness of the circular plate 2213'. The cylindrical projection 2211' is fitted into an inner peripheral surface at one side of the armature coil 23', and is fixed thereto by an adhesive. The supporting member 222' has a configuration similar to the supporting member 221', and therefore has a circular plate 2223' provided at its center with an aperture 2224', a plate-like projection 2222' projecting integrally and radially from the circular plate 2223', and a cylindrical projection 2221' having the same inner diameter as the aperture 2224' and projecting in the direction of the thickness of the circular plate 2223'. The cylindrical projection 2221' is fitted into the inner peripheral surface at the other side of the armature coil 23', and is fixed thereto by an adhesive. Thereby, the armature coil 23' is held at its opposite ends by the supporting member 221' and 222'.

The armature coil 23' as well as the supporting members 221' and 222' which are integrated in the above manner are fitted around the stator 1' (see FIG. 8(A)). The cylindrical projections 2211' and 2221' of the supporting members 221' and 222' serve also as slide bearings which allow smooth sliding on the stator 1'. Thereby, the movable piece 2' having the armature coil 23' and the supporting members 221' and 222' can smoothly reciprocate along the stator 1'. The stator 1' serves also as a guide shaft of the movable piece 2'.

The supporting members 221' and 222' have the plate-like projections 2212' and 2222' projected outward through the window 311' of the yoke 31' as already described, and support the attachment member 5' for attaching the driven member outside the yoke 31'. The supporting members 221' and 222' also have a function of attaching the driven member to the movable piece 2'.

For the three-phase driving which will be described later more in detail, Hall elements which are a kind of magnetoelectrically converting elements are arranged for the coils of the respective phases. These Hall elements are employed as sensors which detect the directions and intensities of the magnetic fields formed by the field magnets 11' at the positions of the U-, V- and W-phase coils in the longitudinal direction of the stator 1' when the movable piece 2' moves along the stator 1', respectively. In this embodiment, the Hall element hu is arranged on the coil $C_{U1}$ at its end, the Hall element hv is arranged on the coil $C_{V1}$ at its end, and Hall element hw is arranged on the coil $C_{W2}$ at its end.

A magnetic sensor 42', which is formed of a magnetoresistance element called an MR element in this embodiment, is located at the position on the movable piece 2' opposed to the encoder chart 41', and is supported inside the armature coil 23'. The chart 41' and the magnetic sensor 42' serves as an encoder 4'. The magnetic encoder chart 41' is superposed on the field magnet 11' in this embodiment, instead of this, the magnetic chart 41' may be formed on a magnetizable member arranged in parallel to the stator 1' and inside of the yoke 31'. In this case, the magnetic sensor 42' is arranged at the position on the movable piece 2' opposed to the chart. An encoder chart of an optical type may be employed instead of the encoder chart of a magnetic type as described above. The optical encoder chart may be formed on a member arranged in parallel to the stator 1', or may be formed on the inner peripheral surface of the yoke 31'. In case that an encoder chart of an optical type is employed, a sensor (e.g., a sensor including a light emission element and a light receiving element) for detecting an optical information of the chart is arranged at the position on the movable piece 2' opposed to the chart.

The cylindrical yoke 31' is made of a ferromagnetic material (iron in this embodiment), and, as described above, substantially entirely covers the outer peripheral surfaces of the stator 1' and the movable piece 2' except for an area of the window 311' provided for projecting the supporting members 221' and 222' outward from the yoke 31'. Openings at the opposite ends of the yoke 31' in the longitudinal direction of the stator are covered with the cover members 32'. In this embodiment, the cover member 32' is made of a nonmagnetic member. The cover member 32' may be made of a magnetic material.

In the linear motor of the invention described above, when the armature coil 23' of the movable piece 2' is energized, the current flowing through the coil 23' and the magnetic field formed by the field magnet 11' mutually act to produce an electromagnetic force in the longitudinal direction of the stator 1'. This electromagnetic force acts on the coil 23' to move the movable piece 2' in the same direction, and thus forms a driving force of the movable piece 2'.

An example of operation control of the linear motor described above will now be described below.

FIG. 12(A) is a schematic block diagram showing an example of an operation control circuit of the linear motor together with the coils of the respective phases.

In the operation control circuit shown in FIG. 12(A), the linear motor is driven in a so-called three-phase driving method, and also in a phase synchronization control method generally called a PLL (phase locked loop) control.

The operation control circuit has a computer 61' which issues a reference clock signal of a frequency corresponding to an intended speed of the linear motor movable piece 2'. This reference clock signal is supplied to a PLL control circuit unit (phase synchronization control circuit unit) 62'. The PLL control circuit unit 62' also receives a signal indicating an actual travel speed of the movable piece 2' fedback from the encoder 4'. The encoder 4' includes the encoder chart 41' and the magnetic sensor 42' as already described. The PLL control circuit unit 62' issues to a compensating circuit unit 63' a signal which corresponds to a phase difference between the reference clock signal sent from the computer 61' and the travel speed signal sent from the encoder 4'. The compensating circuit unit 63' compensates a lead and a delay in the transmission system, and the compensated signal corresponding to the phase difference between the reference clock signal and the travel speed signal is supplied to a current supply control circuit unit 64'.

The current supply control circuit unit 64' supplies currents to the U-, V- and W-phase coils. Each of these currents corresponds to the signal corresponding to the phase difference between the reference clock signal and the travel speed signal, and also corresponds to the direction of the magnetic field which is detected at the position of the coil by the Hall element arranged on the coil of corresponding phase. In this embodiment, the currents are supplied to the coils in accordance with the current supply patterns shown in FIG. 12(B). At the positions $\hat{1}$ to $\hat{6}$ shown in FIGS. 12(B), currents are flowing through the U-, V-, and W-phase coils in the directions shown in FIGS. 12(C) and 12(D). Since these coils are arranged as described above, and the winding directions of these coils are as shown in FIG. 8(B), the force acts to the each coil in the same direction. Thereby, the driving force can be substantially constant independently of the position of the movable piece 2' in the longitudinal direction of the stator. The coil of each phase is supplied with the current, which acts to synchronize the phase of the reference clock signal corresponding to the intended speed with the phase of the signal corresponding to the actual travel speed of the movable piece 2', so that the movable piece 2' can be driven at the intended speed.

Figure 13:
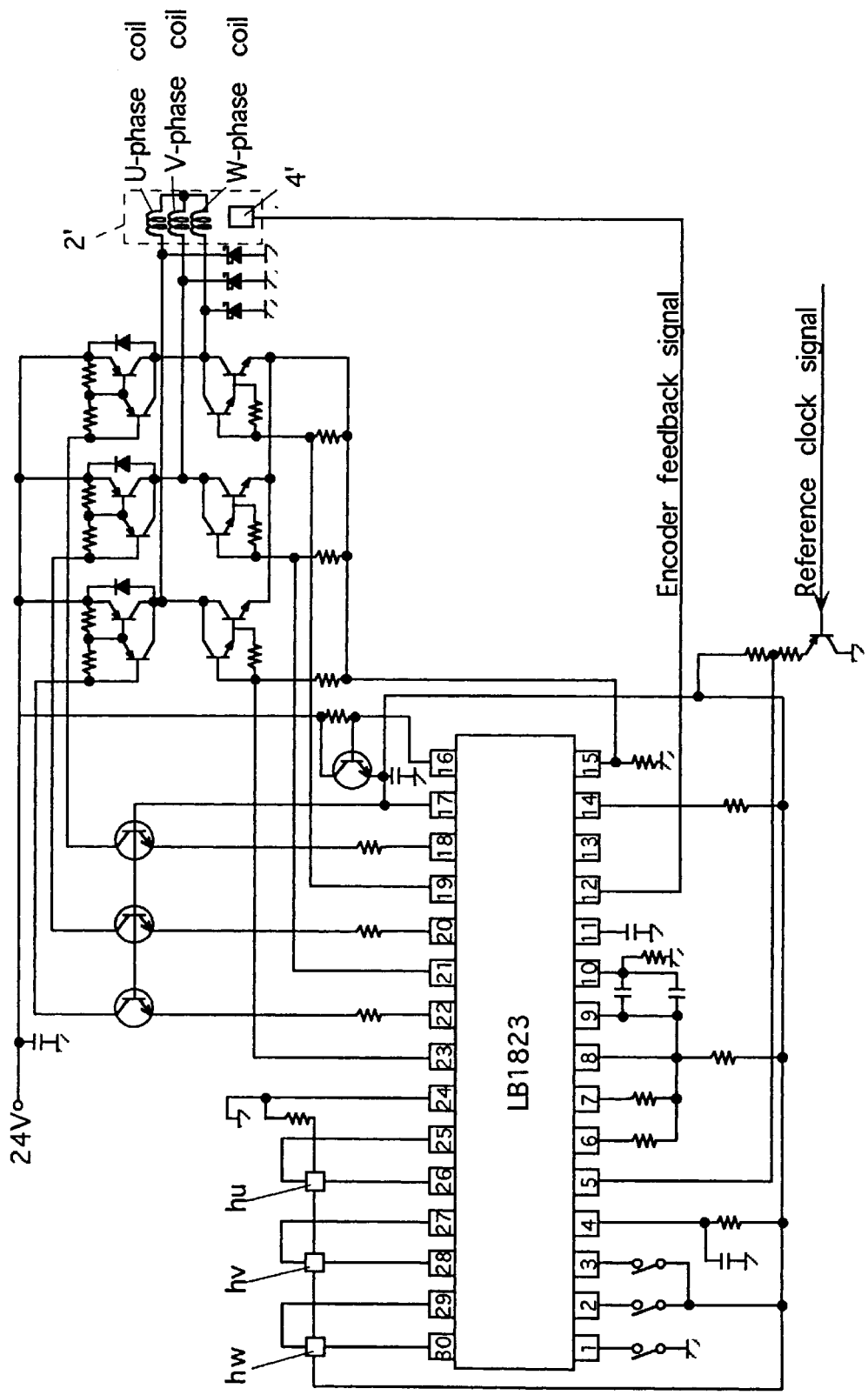
FIG. 13 shows an example of an operation control circuit in FIG. 12.

FIG. 13 shows an example of the operation control circuit. The operation control circuit in FIG. 13 is constructed with a motor drive IC LB1823 (manufactured by Sanyo Denki Co., Ltd.) including the PLL control circuit unit 62' and the compensating circuit unit 63' as a main component.

In the linear motor of the invention as described above, the stator 1' and the movable piece 2' are substantially entirely covered with the cylindrical yoke 31' and the cover members 32' except for an area of the window 311', so that adhesion of dust or the like onto the surface of the stator 1' is suppressed, and thereby good sliding between the stator 1' and the movable piece 2' can be maintained for a long term. A possibility of breakage of the stator 1' and/or the movable piece 2', caused by contact with another member, can be small. From the viewpoint of this, the yoke 31' functions as a cover.

Figure 25:
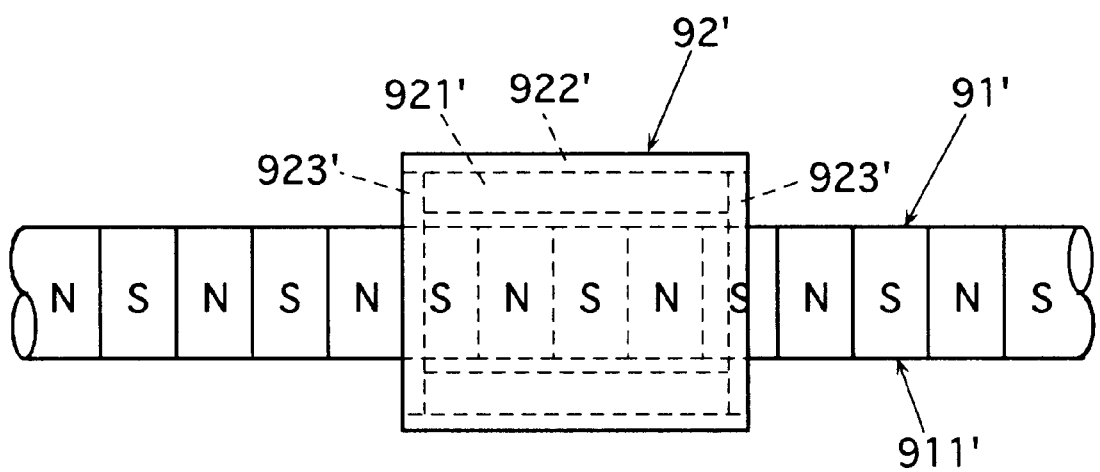
FIG. 25 is a schematic side view of a linear motor in the prior art.

Since the magnetic field formed by the field magnet 11' liable to form a magnetic loop through the yoke 31' made of a ferromagnetic material, the intensity of the magnetic field acting on the armature coil 23' inside the yoke 31' is larger than that in the case where the yoke is not employed, so that the linear motor can generate a larger driving power. Thus, owing to the yoke 31', the magnetic field formed by the field magnet 11' can efficiently act on the energized armature coil 23'. As the distance between the field magnet 11' and the yoke 31' decreases, and in other words, as the clearance between the outer peripheral surface of the movable piece 2' and the inner peripheral surface of the yoke 31' decreases, the magnetic field formed by the field magnet 11' can act on the armature coil 23' more efficiently. In the conventional linear motor shown in FIG. 25, the yoke 922' for efficiently exerting the magnetic field formed by the field magnet 911' on the armature coil 921' moves together with the movable piece 92'. Therefore, the magnetic attractive force acting on the end of the yoke 922' varies, resulting in cogging. In the linear motor of the invention, however, the yoke 31' does not move together with the movable piece 2' and is stationarily arranged, so that a problem of cogging does no arise. Therefore, the movable piece 2' can move smoothly along the stator 1'.

Since the yoke 31' is made of a ferromagnetic material, it is possible to reduce an influence exerted on equipments outside the yoke 31' by the magnetic fields formed by the field magnet 11' and the energized armature coil 23'. Likewise, it is possible to reduce an influence exerted by the magnetic field outside the yoke 31' on the movable piece 2' and the stator 1' inside the yoke 31', and particularly the encoder. In other words, the yoke 31' has a magnetic shield effect.

Figure 14:
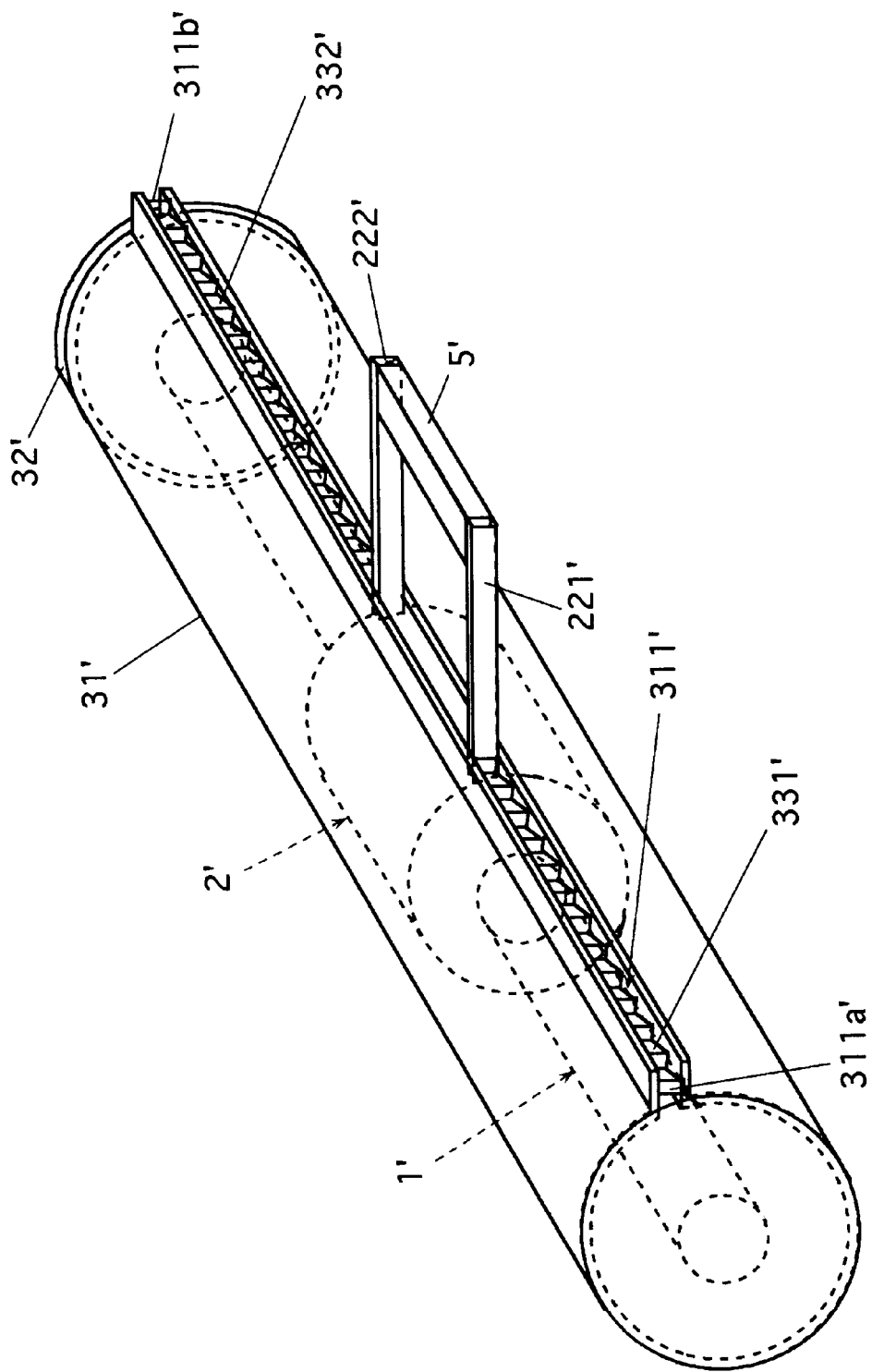
FIG. 14 is a schematic perspective view of another example of a linear motor according to the invention with a certain part removed.

In order to further suppress adhesion of dust or the like onto the surface of the stator 1' by suppressing entry of dust or the like through the window 311', bellows-like extensible covers 331' and 332' can be arranged at the window 311' as shown in FIG. 14. The extensible cover 331' has an end fixed to an end 311a', of the window 311' and the other end fixed to the supporting member 221', and covers a space in the window 311' at the left side in the figure. Likewise, the extensible cover 332' has an end fixed to an end 311b' of the window 311' and the other end fixed to the supporting member 222', and covers a space in the window 311' at the right side in the figure. The bellows-like covers 331' and 332' can expand and shrink in accordance with travel of the movable piece 2', and therefore do not impede the travel of the movable piece 2'.

Figure 15:
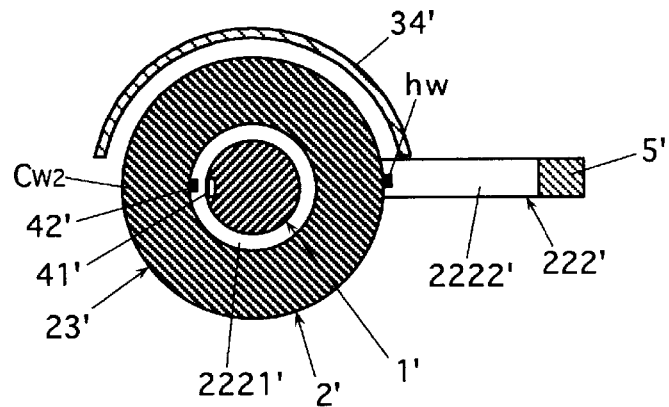
FIG. 15 is a schematic cross section of still another example of a linear motor according to the invention.
Figure 16:
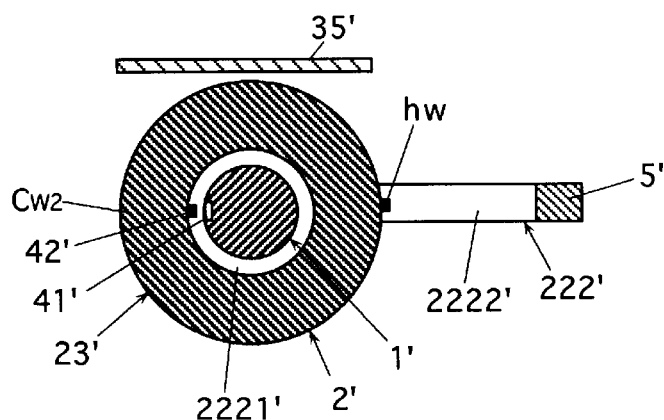
FIG. 16 is a schematic cross section of further another example of a linear motor according to the invention.

In the above embodiment, the yoke 31' has a substantially cylindrical form covering substantially entirely the stator 1' and the movable piece 2', but may have another form. For example, it may have a form shown in FIG. 15 or FIG. 16. The linear motors shown in FIGS. 15 and 16 employ yokes, which will be described below, instead of the yoke 31' in the linear motor shown in FIGS. 7 to 10. Parts and portions performing the substantially same operations bear the same reference numbers and symbols. FIGS. 15 and 16 show sections perpendicular to the moving direction of the movable piece (longitudinal direction of the stator).

A yoke 34' of the linear motor shown in FIG. 15 has a semicylindrical form having a semicircular section, and extends over an entire travel area of the movable piece 2'. The yoke 34' is made of a ferromagnetic material, and is stationarily arranged.

The linear motor shown in FIG. 16 includes a yoke 35' of a plate-like form extending over an entire travel area of the movable piece 2'. Similarly to the yoke in FIG. 15, the yoke 35' is made of a ferromagnetic material, and is stationarily arranged.

Although these yokes 34' and 35' can not sufficiently perform the function as a cover, they can serve to exert efficiently the magnetic field of the field magnet 11' on the armature coil 23' compared with the case where the yoke is not employed. Further, they can eliminate the possibility of cogging. Since the yokes 34' and 35' do not entirely cover the stator 1' and the movable piece 2', these structures facilitate adjustment of a positional relationship and assembling of the stator 1' and the movable piece 2', and can reduce the cost.

Figure 17:
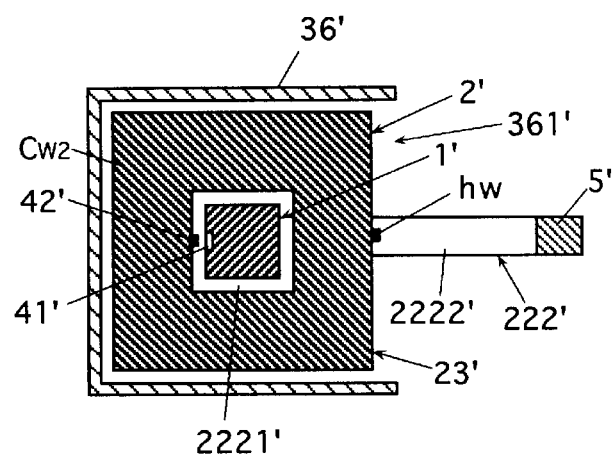
FIG. 17 is a schematic cross section of still further another example of a linear motor according to the invention.

In the embodiments described above, the stator has a circular section. However, they may have a polygonal section such as a triangular, square or pentagonal section. Although the armature coil is formed of annular windings of coils having a circular configuration, they may have a polygonal configuration such as a triangular, square or pentagonal configuration. An example of the linear motor is shown in FIG. 17. FIG. 17 shows a section perpendicular to the movable piece moving direction of the linear motor. The substantially same parts and portions as those of the linear motor shown, e.g., in FIG. 7 bear the same reference numbers and symbols.

In the linear motor shown in FIG. 17, a movable piece 2' including an armature coil 23' is fitted around a stator 1' having a square section. The armature coil 23' has a square configuration. A yoke 36' is stationarily arranged around the movable piece 2'. The yoke 36' has a nearly U-shaped section, which is fitted in the shape of the movable piece 2', and in other words has a square section with one side removed. The yoke 36' has a window 361', and extends over an entire travel area of the movable piece 2'. This linear motor can provide an effect substantially similar to that of the linear motor, e.g., shown in FIG. 7.

Figure 18A:
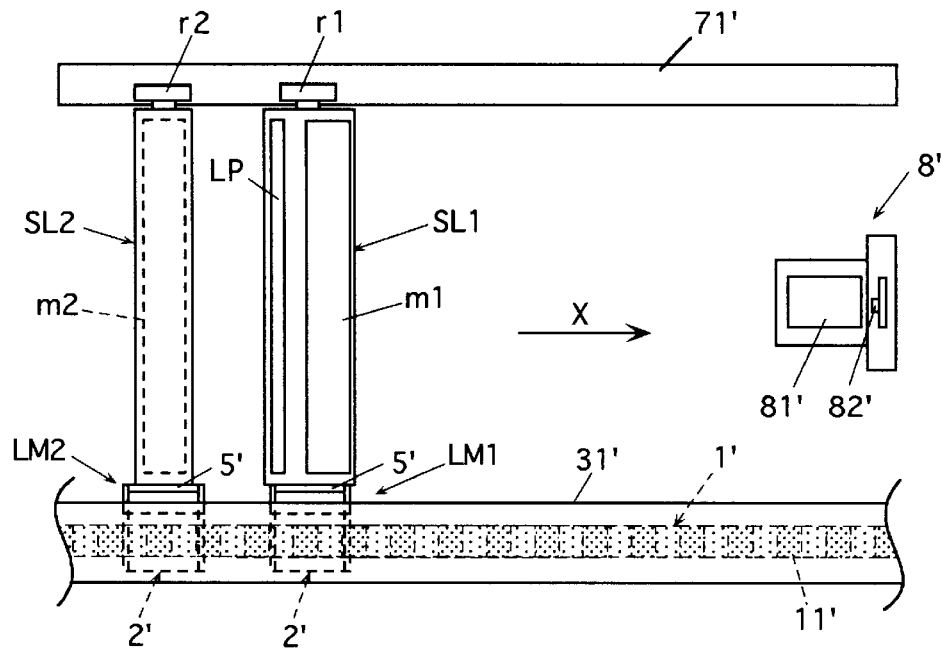
FIG. 18(A) is a schematic plan of an image reading apparatus employing the linear motor of the invention.
Figure 18B:
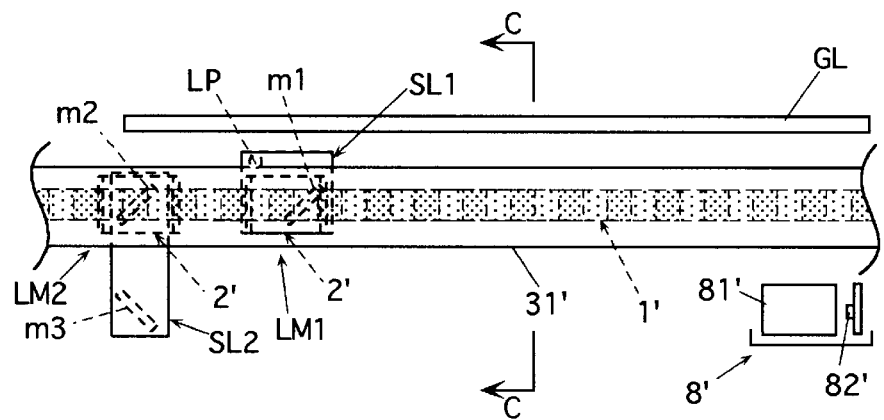
FIG. 18(B) is a schematic side view of the apparatus.
Figure 18C:
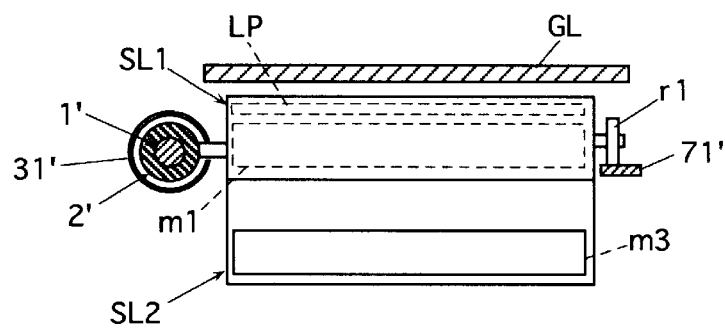
FIG. 18(C) is a schematic cross section of the apparatus taken along line C—C in FIG. 18(B)

FIGS. 18(A), 18(B) and 18(C) show an image reading apparatus employing a linear motor according to the invention described above. FIG. 18(A) is a schematic plan of the apparatus. FIG. 18(B) is a schematic side view of the apparatus. FIG. 18(C) is a schematic cross section of the apparatus taken along line in C—C in FIG. 18(B). In FIG. 18(A), an original document table glass is not shown.

This image reading apparatus can optically scan and read the original image of the document laid on an original document table glass GL, and is employed and arranged, for example, in an image scanner or a copying machine for reading the original image. The linear motors according to the invention are utilized for linearly reciprocating the two sliders SL1 and SL2 carrying optical parts for optically scanning the original image. Thus, these two sliders SL1 and SL2 are driven members in this embodiment. The slider SL1 is connected to a linear motor LM1 according to the invention, and the slider SL2 is connected to a linear motor LM2 according to the invention.

The linear motors LM1 and LM2 have different coil winding numbers which are adjusted for achieving the required performances, respectively, but have the substantially same basic structures as the linear motor shown in FIG. 7. These two linear motors LM1 and LM2 commonly use the stator 1' having the field magnet 11' and the yoke 31' made of a ferromagnetic material in a cylindrical form.

The slider SL1 carries a lighting lamp LP for lighting the original document laid on the original document table glass GL, and also carries a mirror m1 for reflecting the light beams coming from the original document toward a mirror on the slider SL2. An end of the slider SL1 is coupled to the movable piece 2' of the linear motor LM1, and more specifically is connected to the movable piece 2' of the linear motor LM1 through the attachment member 5' projected outward from the yoke 31'. The slider SL1 has on the other end a roller r1 which can travel on a plate guide member 71' arranged parallel to the stator 1'. Thereby, the slider SL1 can maintain a stable posture during reciprocation along the stator 1'.

The slider SL2 carries mirrors m2 and m3 for leading the original image light beams coming from the mirror m1 on the slider SL1 toward a reading unit 8'. An end of the slider SL2 is connected to the movable piece 2' of the linear motor LM2, and more specifically is connected to the movable piece 2' of the linear motor LM2 through the attachment member 5' projected outward from the yoke 31'. The slider SL2 has on the other end a roller r2 which can travel on the plate guide member 71'. Thereby, the slider SL2 can maintain a stable posture during reciprocation along the stator 1'.

The reading unit 8' includes an image sensor 82' (a CCD in this embodiment) for reading the original image light beams led by the mirrors m1, m2 and m3, and also includes a lens 81' for focusing the original image light beams onto the sensor 82'.

In the operation of reading the image of the original document laid on the original document table glass GL, the lighting lamp LP is turned on, and the slider SL1 is driven at a predetermined speed in the direction X parallel to the stator 1'. Also, the slider SL2 is moved in the same direction as the slider SL1 at half the speed of the slider SL1. Thereby, the original document is entirely scanned. The light beams reflected by the original document are led by the mirrors m1, m2 and m3 to the lens 81', and are thereby focused onto the sensor 82' to be read. In this manner, reading is successively performed.

Since both the sliders SL1 and SL2 are driven by the linear motors according to the invention, they are driven smoothly without cogging, which allows better image reading. Since the stator 1' is substantially entirely covered by the yoke 31' serving also as the cover, adhesion of dust or the like onto the stator 1' is suppressed, which ensures a good sliding state between the stator 1' and the movable piece 2' for a long term, and therefore the image reading apparatus can perform good image reading for a long term. Owing to the effect by the yoke 31', the motors LM1 and LM2 can generate larger driving forces than those in the case where the yoke is not employed, so that each slider can move at a higher travel speed. Therefore, it is possible to reduce a time required for one cycle of the image reading operation from start of driving of each slider from the initial position toward the image reading end position to return to the initial position.

The linear motor according to the invention may be employed only for one slider SL1 (or SL2), and the other slider SL2 (or SL1) may be driven in accordance with one slider SL1 by connecting the other slider SL2 to one slider SL1 through a coupling mechanism such as a wire and a pulley. In this case, parts of this coupling mechanism may be partially arranged inside the cylindrical yoke 31', if necessary.

The shaft-type linear motor according to the invention which has been described above can suppress cogging while allowing the magnetic field formed by the field magnet to act efficiently on the armature coil. Also, the linear motor can suppress influences of noises (e.g., magnetism) which are exerted internally and externally through the yoke, and can further suppress adhesion of dust or the like onto the stator. However, the following shaft-type linear motor may be employed, if only suppression of adhesion of dust or the like onto the stator is required.

(3) The shaft-type linear motor described above may include a rod-like stator having a driving field magnet formed of a shaft member provided with N- and S-type magnetic poles arranged alternately in the longitudinal direction of the shaft member, and a movable piece having an armature coil fitted around the stator and being reciprocatable along the longitudinal direction of the stator. In this linear motor, said rod-like stator and the movable piece are covered with a protection cover, and the protection cover supports a portion of the stator at a position outside a range of travel of the stator, allows the reciprocation of the movable piece within the cover and has a window for coupling therethrough a driven member outside the cover to the movable piece.

In this shaft-type linear motor, the rod-like stator and the movable piece, which is fitted around the stator and is reciprocatable along the stator, are substantially entirely covered with the protection cover. Therefore, adhesion of dust or the like onto the stator is suppressed. Even when another object is brought into contact with the stator, a possibility of breakage thereof can be small.

The driven member arranged outside the protection cover is coupled directly or indirectly via another member to the movable piece through the window.

In the shaft-type linear motor described above, the stator, movable piece and protection cover are integrated to allow handling as one unit. This is advantageous from the viewpoint of transportation, storage, and installation.

The protection cover may be made of a nonmagnetic material such as plastics. The protection cover made of a nonmagnetic material is not magnetized by the field magnet.

The protection cover may be an assembly formed of two or more independent parts for easy and efficient assembling operation. In this case, the independent parts of the cover are joined together, e.g., by screws, fitting or adhesive.

The movable piece may be provided with an attachment member for attaching the driven member outside the protection cover to the movable piece. This attachment member projects outward from the cover through the window in the cover. The window may typically have a long form extending in the longitudinal direction of the stator and entirely covering the travel area of the attachment member which reciprocates together with the movable piece. A window cover may be employed for covering a portion in the window other than the attachment member. The window cover may be extensible to allow expansion and shrinkage in accordance with reciprocation of the attachment member, and may be of a bellows type. The window cover may include an electric power supply cable for driving the movable piece.

Any of the shaft-type linear motors provided with the protection covers according to the invention may employ movable piece posture control means, which allows movement of the movable piece while keeping the constant position and posture of the movable piece around the stator, and therefore allows the stable postures of the movable piece and the driven member attached thereto during movement thereof. This movable piece attitude control means may be a roller, which is rotatably arranged on the movable piece, the attachment member or the driven member, and a guide member (e.g., guide rail) for guiding the rotary roller. If the rotary roller is arranged on the movable piece or the attachment member, the rotary roller can be located within the protection cover, and the protection cover may serve also as the guide member. A sliding member may be employed instead of the rotary member, i.e., roller.

Any one of the shaft-type linear motors according to the invention may be provided with a linear encoder for detecting the position of the movable piece. This linear encoder may be of either an optical or magnetic type. The linear motor may further employ home detecting means for detecting a home position of the movable piece.

The driven member may be a slider carrying an optical part or device for optically scanning and reading an original image in an image reading apparatus arranged, e.g., in a copying machine or an image scanner.

Preferred embodiments of the shaft-type linear motors will be described below with reference to FIGS. 19 to 24(B).

Figure 19:
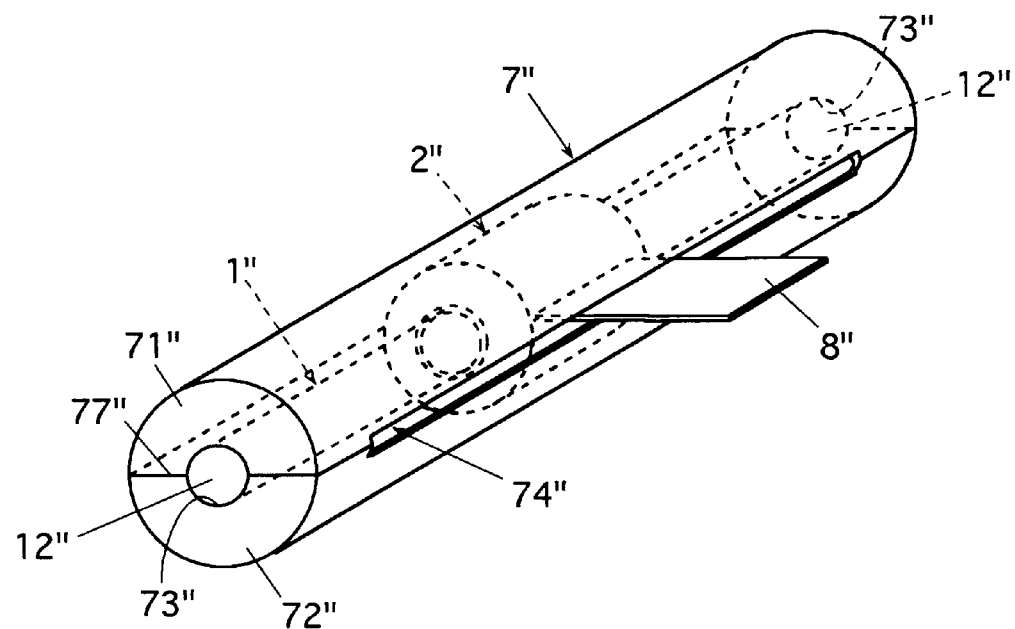
FIG. 19 is a schematic perspective view of an example of a shaft-type linear motor according to the invention.
Figure 20:
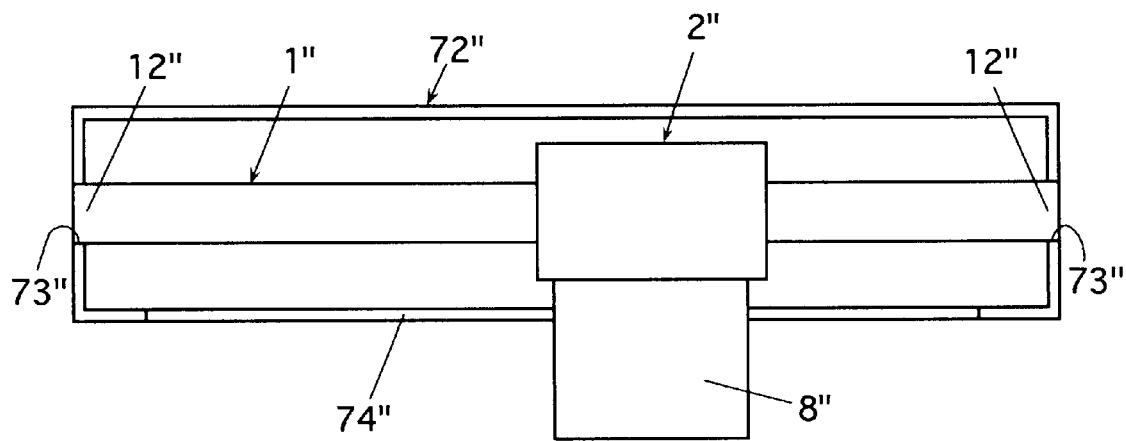
FIG. 20 is a plan of the linear motor shown in FIG. 19 with an upper cover member removed.

FIGS. 19 to 21(C) shows an example of the shaft-type linear motor provided with a protection cover in a unit form according to the invention. FIG. 19 is a schematic perspective view of the linear motor, and FIG. 20 is a plan of the linear motor with an upper cover of the protection cover shown in FIG. 19 removed. FIG. 21(A) is a schematic cross section of the linear motor body shown in FIG. 19 taken along vertical plane with a certain part removed (cover is not shown). FIG. 21(B) is a cross section taken along line A—A in FIG. 21(A), and FIG. 21(C) shows a distribution of magnetic flux of a field magnet.

In this linear motor unit, as shown in FIGS. 19 and 20, a movable piece 2" is fitted around a shaft-like stator 1" having a circular section. The stator 1" and the movable piece 2" are substantially entirely covered with a cylindrical protection cover 7".

The stator 1" has opposite ends 12", fitted into apertures 73" formed at the protection cover 7", and thereby is supported by the cover 7". The movable piece 2" is reciprocatable along the stator 11", and is provided with a driven member attachment member 8" for attaching a driven member to be driven together with the movable piece 2". The driven member may be a carriage carrying optical parts for optically reading an image in an image reading apparatus arranged, e.g., in a copying machine or an image scanner.

The protection cover 7" is made of a nonmagnetic material such as plastics, and is provided with a window 74" extending over a travel area of the movable piece 2". The driven member attachment member 8" partially projects outward from the protection cover 7" through the window 74" for attaching the driven member to the member 8". The protection cover 7" is formed of upper and lower cover members 71" and 72", and are joined together by an adhesive at contact surfaces (joined surfaces) 77" of the cover members 71" and 72". The cover members 71" and 72" may be disengageably joined together by screws, mutual fitting or the like. The yokes 31' shown in FIGS. 7 and 14 may be formed of an assembly of two or more parts similar to the above.

The stator 1" and the movable piece 2" will be described below with reference to FIGS. 21(A), 21(B) and 21(C).

The stator 1" is formed of a straight shaft member 10" of a circular section, which is made of a machinable and magnetizable material and has a machined smooth surface. The shaft member 10" is magnetized to form a field magnet 11", which is provided with N- and S-type magnetic poles alternately arranged with a pitch of 30 mm along the longitudinal direction of the shaft member 10". In this embodiment, the magnetic field formed by the field magnet 11" has a distribution of a substantially trapezoidal waveform as shown in FIG. 21(C). The stator 1" is further provided with an encoder chart 31" (finely magnetized portion), which is superposed thereon and forms a part of a magnetic encoder 3" for position detection and speed control of the movable piece 2". The encoder chart 31" is formed of N- and S-type magnetic poles which are alternately magnetized with a pitch of 100 µm.

The movable piece 2" includes an armature coil 23" formed of a plurality of annular coils which are fitted around the stator 1" with a space therebetween. The armature coil 23" is supported at an inner side of a movable piece yoke 24" made of a cylindrical magnetic material having a circular section. The movable piece yoke 24" is provided at its opposite ends with bearings 21", which allow smooth movement of the movable piece 2" along the stator 1".

The armature coil 23" of the movable piece 2" is formed of three-phase annular coils u, v and w which are arranged at positions shifted by an electrical angle of $2\pi/3$ from each other (or positions of the same phases as those shifted by an electrical angle of $2\pi/3$ from each other). For the u-phase coil, a Hall element hu which is a kind of magnetoelectrically converting element is arranged as a drive sensor at the position opposed to the field magnet 11". Likewise, Hall elements hv and hw are arranged at the positions on the v- and w-phase coils opposed to the field magnet sensor 11", respectively. The movable piece yoke 24" is provided at a position opposed to the encoder chart 31" with a magnetic sensor 32" (a magnetoresistance element called an MR element in this embodiment).

The protection cover 7" (see FIGS. 19 and 20) is provided with apertures through which a power supply cable for the armature coil 23", a signal harness for the Hall elements hu, hv and hw and a signal harness for the magnetic sensor 32" are led outward from the protection cover 7".

An operation control of the linear motor described above will be described below.

As already described, the field magnet 11" of the stator 1" provides a distribution of magnetic density flux of a trapezoidal waveform of which one period is defined by N- and S-magnetic poles. As also already described, the armature coil 23" of the movable piece 2" is formed of three-phase coils u, v and w arranged at the positions shifted from each other by an electrical angle of $2\pi/3$ (or positions of the same phases as those shifted by an electrical angle of $2\pi/3$). In this embodiment, the movable piece 2" is provided with Hall elements hu, hv and hw. These Hall elements detect the magnitudes and directions of the magnetic flux of the field magnet 11" at the positions thereof. A current of the magnitude and direction corresponding to the magnitude and direction of the magnetic flux detected by each Hall element is supplied to the corresponding coil for driving the motor. Thus, a so-called three-phase driving method is employed in this embodiment, and signals shifted by a phase of 120 degrees from each other are supplied to the coils, and thereby a substantially constant driving force can be produced independently to the position of the movable piece 2". The three-phase driving method is employed, and also the phase synchronization control method generally called PLL (phase locked loop) control is employed for driving the movable piece 2" at a target speed.

Figure 22A:
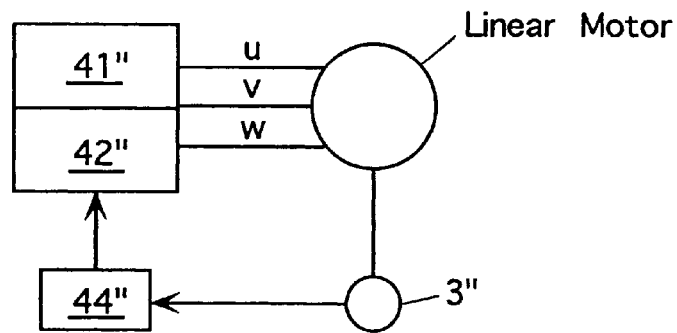
FIG. 22(A) is a block diagram schematically showing an operation control circuit of the linear motor shown in FIG. 19.
Figure 22B:
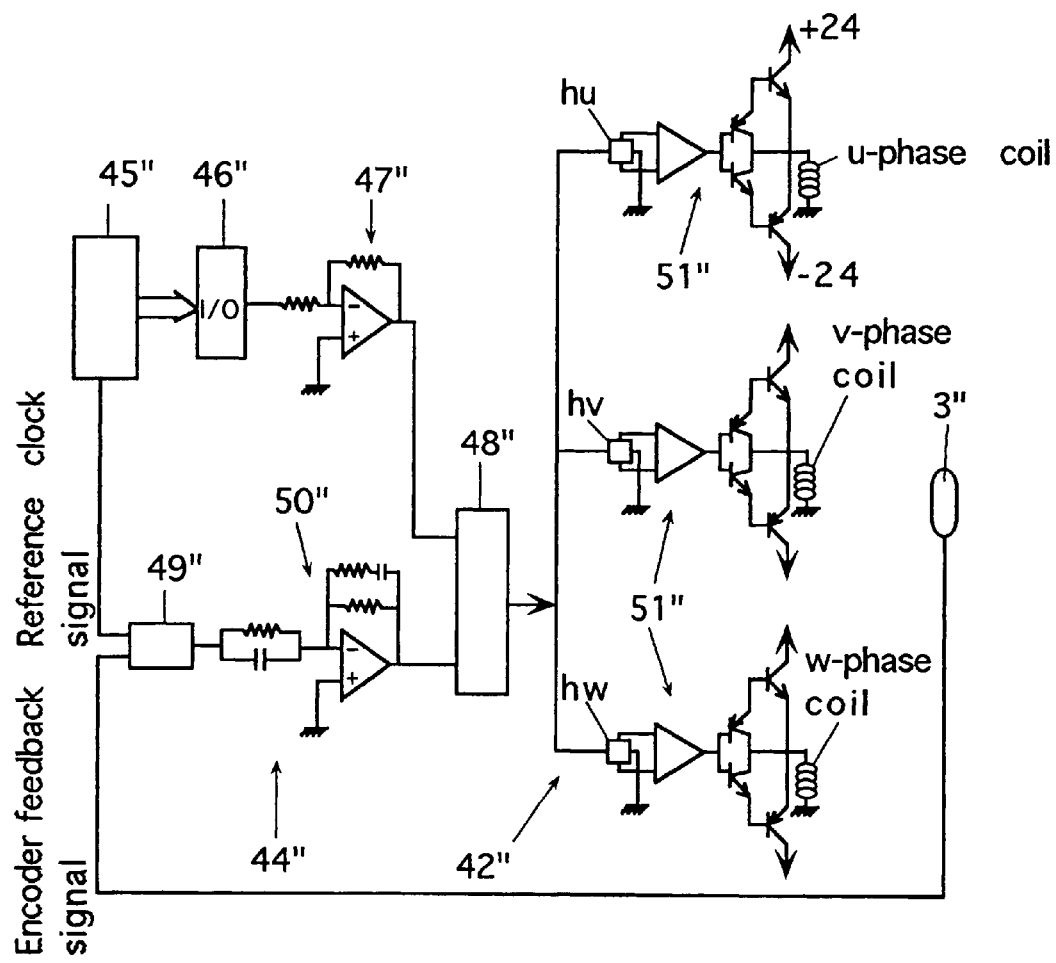
FIG. 22(B) shows a major portion of the operation control circuit including a speed control circuit of a phase lock control type.

FIG. 22(A) is a schematic block diagram of an electric circuit for operation control of the linear motor. FIG. 22(B) shows a major portion of an operation control circuit including a speed control circuit of the phase synchronization control type.

In FIGS. 22(A) and 22(B), 41" indicates a DC power source, 42" indicates a current supply control circuit unit including the Hall elements, 3" indicates the encoder for detecting the moving speed of the movable piece 2", and including the encoder chart 31" and the magnetic sensor 32" described above. The encoder is of a magnetic type, and is operable to read the magnetism of the encoder chart 31" on the stator 1" by the magnetic sensor 32". 44" indicates a speed control unit of the phase synchronization control type.

In FIG. 22(B), 45" indicates a microcomputer which issues instructions for predetermined operations of the linear motor, and also issues a reference clock signal to a phase synchronization control unit 49". 46" indicates an input/output port of the computer 45". 47" indicates an amplifier. 48" indicates a switching unit, and 49" indicates the phase synchronization control unit. 50" indicates a compensating circuit, and 51" indicates an amplifier circuit.

In the control circuit shown in FIGS. 22(A) and 22(B), the computer 45" issues the reference clock signal corresponding to an intended speed to the phase synchronization control unit 49", and the encoder 3" feeds back the moving speed signal indicating the actual speed of the movable piece 2" to the control unit 49". The phase synchronization control unit 49" issues the signal corresponding to differences in frequency and phase between the pulse of the reference clock and the pulse of the fedback signal sent from the encoder 3" into the compensating circuit 50". Thereafter, the compensating circuit 50" compensates a lead or delay at the transmission system and issues a voltage signal thus compensated. The output voltage of the compensating circuit 50" is used as reference input voltages of the Hall elements. As already described, the Hall elements issue the voltages corresponding to the magnitudes and directions of the magnetic fluxes at the positions of the same, and the output voltages are proportional to the reference input voltage. Therefore, each Hall element issues the output voltage corresponding to the difference between the reference clock signal and the fedback signal of the encoder 3". The output voltage of each Hall element is proportionally amplified by the amplifier circuit 51", and a current corresponding to thus amplified voltage is supplied to the armature coil. In this manner, the frequency and phase of the pulse of the fedback signal from the encoder 3" are synchronized with those of the reference clock signal, and in other words, the linear motor is driven to attain the target speed of the movable piece 2".

In the shaft-type linear motor provided with the protection cover in a unit form according to the invention, the stator 1" and the movable piece 2" are substantially entirely covered with the protection cover 7", so that adhesion of dust or the like onto the stator 1" can be suppressed, and a possibility of damage of the stator 1" caused by contact with another member can be small. Therefore, a problem in sliding between the stator 1" and the movable piece 2" can be prevented, and a good sliding state between the stator 1" and the movable piece 2" can be maintained for a long term, so that the motor can operate stably and precisely. Since the stator 1", movable piece 2" and protection cover 7" are integrated together to form a single unit, this facilitates handling in storage, transporting and installing operations. Since the protection cover 7" is formed of two independent parts, i.e., upper and lower cover members 71" and 72", this facilitates an assembling operation. Since the protection cover 7" is made of a nonmagnetic material, the protection cover 7" is not magnetized by the field magnet 11" or the like, which facilitates handling and others in the operation of installing this linear motor as a unit into an equipment or the like.

Figure 23:
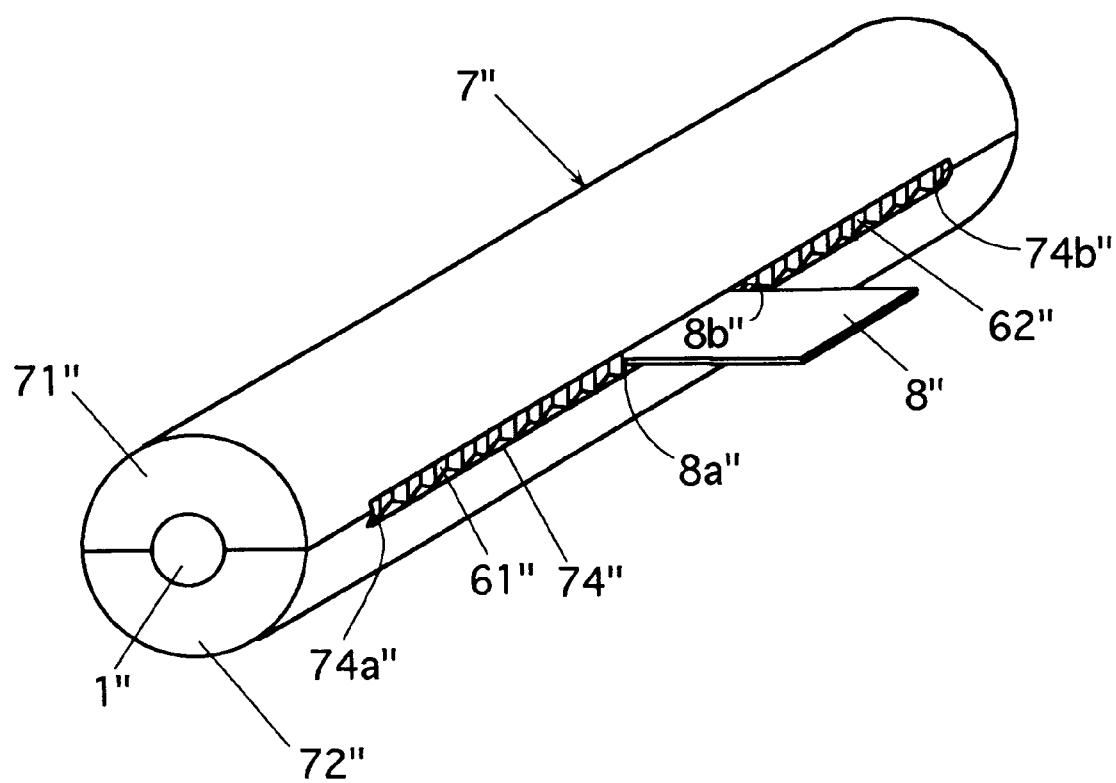
FIG. 23 is a schematic perspective view of another example of a shaft-type linear motor according to the invention.

In the linear motor shown in FIG. 19, the window 74" at the protection cover 7" has a gap allowing entry of dust or the like. This linear motor may be provided with a bellows-like cover covering the gap for further suppressing adhesion of dust or the like onto the stator 1", as shown in FIG. 23. FIG. 23 is a schematic perspective view of another embodiment of a shaft-type linear motor provided with a protection cover in a unit form.

In the shaft-type linear motor shown in FIG. 23, bellows-like covers 61" and 62" cover gaps in the window 74" at the protection cover 7", and more specifically cover the spaces formed at the opposite sides (i.e., at the right and left in FIG. 23) of the attachment member 8" projected from the window 74". The cover 61" has an end fixed to an end 74a" of the window 74" and the other end fixed to an end 8a" of the attachment member 8". Likewise, the cover 62" has an end fixed to an end 74b" of the window 74" and the other end fixed to an end 8b" of the attachment member 8". The bellows-like covers 61" and 62" can expand and shrink in accordance with movement of the movable piece 2" and the attachment member 8", and thereby prevent entry of dust or the like through the gaps. Therefore, adhesion of dust or the like onto the stator 1" can be suppressed to a higher extent than the linear motor shown in FIG. 19, and thus a problem in sliding of the movable piece 2" along the stator 1" can be prevented to a higher extent. Therefore, a good sliding state between the stator 1" and the movable piece 2" can be maintained for a longer term.

In the linear motor unit shown in FIG. 23, the bellows-like covers 61" and 62" serve also as a power supply cable to the armature coil 23" of the movable piece 2" as well as power supply and signal cables for the Hall elements hu, hv and hw, and the magnetic sensor 32". This further improves the handling property, and can reduce the cost and sizes of the motor unit.

It should be noted that, in the linear motor shown in FIG. 14, the bellows-like covers 331' and 332' may be constructed to serve also as a power supply cable to the armature coil 23' of the movable piece 2' as well as power supply and signal cables for the Hall elements hu, hv and hw and the magnetic sensor 42'.

Figure 24A:
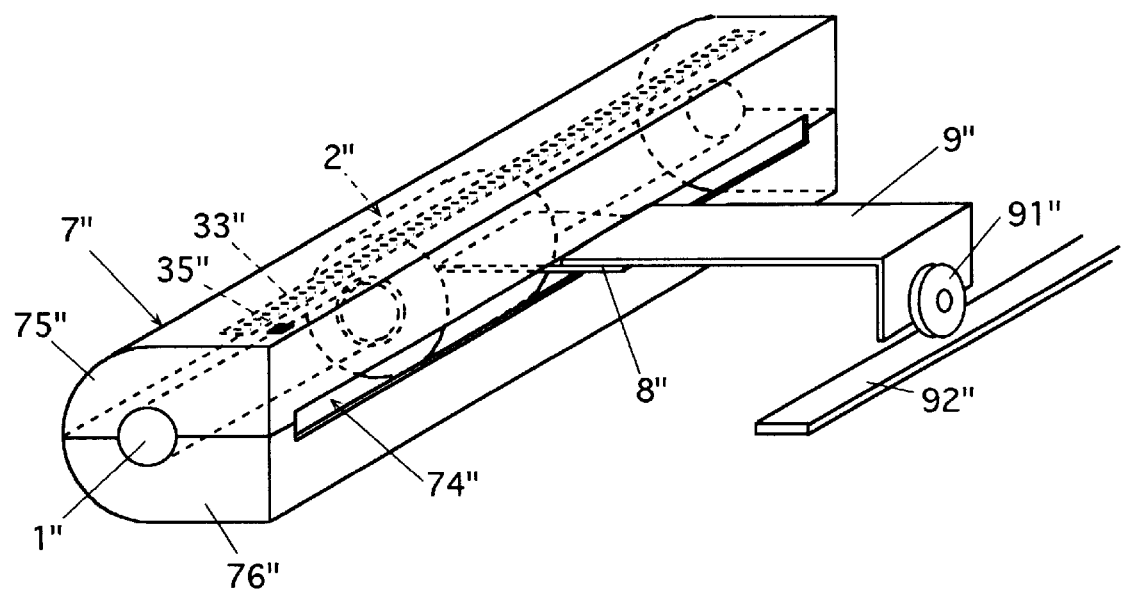
FIG. 24(A) is a schematic perspective view showing still another example of a shaft-type linear motor according to the invention with a driven member attached thereto.
Figure 24B:
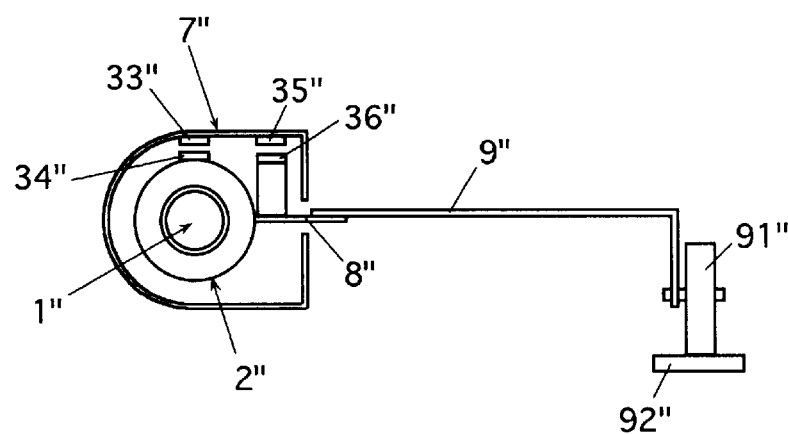
FIG. 24(B) is a schematic cross section of the linear motor shown in FIG. 24(A)

FIGS. 24(A) and 24(B) shows a still another embodiment of the invention, and particularly show a shaft-type linear motor provided with a protection cover in a unit form together with a driven member attached thereto. FIG. 24(A) is a schematic perspective view of the motor, and FIG. 24(B) is a schematic cross section of the motor.

The stator 1" and the movable piece 2" are substantially the same as those shown in FIG. 19. The stator 1" and the movable piece 2" are covered substantially entirely with the cover 7" formed of two members, i.e., upper and lower cover members 75" and 76". The protection cover 7" is provided with the window 74" extending over a travel area of the movable piece 2", through which the driven member attachment member 8" fixed to the movable piece 2" projects outward. The attachment member 8" is fixed to a driven member, i.e., a carriage 9" having an L-shaped section by screws. The carriage 9" rotatably carries on its end a roller 91" which can travel on a guide rail 92" parallel to the stator 1", and thereby the movable piece 2" and the carriage 9" can keep stable posture during travel along the stator 1". Thus, the roller 91" and the guide rail 92" are an example of movable piece posture control means for stabilizing the posture and position of the movable piece 2" around the stator 1" during travel of the movable piece 2".

Although the carriage 9" is made of a simple plate in this embodiment, it may be a carriage (slider) carrying optical parts in an image reading apparatus.

In the example shown in FIG. 24, an optical encoder is employed instead of the magnetic encoder. An encoder chart 33" of the encoder is arranged inside the upper cover member 75". As a detection sensor of the encoder, an optical sensor 34" is arranged at an upper position of the movable piece 2" and is opposed to the encoder chart 33". The optical encoder 33" is formed of high-reflectance portions and low-reflectance portions, which are arranged alternately to each other with a fine pitch and are prepared, e.g., by printing or paint coating. In this embodiment, these portions are formed of a pattern of white and black portions with a constant pitch. The optical sensor 34" is formed of a light emitter and a light receiver. The light beams emitted from the light emitter are reflected by the high- or low-reflectance portion of the chart 33", and are received by the light receiver. Based on the intensity of the light beams received by the light receiver, on/off signal for position detection is obtained. In the optical sensor 34" of this embodiment, as the light emitter a light-emitting diode (LED) is employed, and as the light receiver a photodiode is employed.

For detection of the home position of the movable piece 2", the inner surface of the protection cover 7" is painted in white (or black), a marker 35" is painted in black (or white) on the inner surface of the upper cover 75", and an optical home detecting sensor 36" is arranged at a position opposed to the marker 35" on the attachment member 8". The home detection sensor 36" has the structure similar to that of the sensor 34", and is adapted to detect the marker position, i.e., home position based on a difference in reflectance between the color of the inner surface of the cover 75" and the color of the marker 35". Similar marker and home detection sensors may be arranged in the linear motor shown in FIG. 7.

In the linear motor shown in FIG. 24, gaps are present in the window 74". These gaps may be covered with bellows-like covers similar to those shown in FIG. 23.

In the linear motors shown in FIGS. 19 and 23, the attachment member 8" may pivot around the stator 1". Similar manner in the linear motor shown in FIG. 24, the linear motors shown in FIGS. 19 and 23 may employ the roller or the like, which is arranged at the driven member, and can travel on the guide rail or the like parallel to the stator 1", so that the movable piece 2", the attachment member 8" and therefore the driven member can keep stable posture during travel. Alternatively, a roller (or sliding element) and a guide rail similar to those already described may be arranged inside the protection cover, whereby stable attitude can be kept during travel. In this case, the roller can be rotatably arranged on the attachment member 8", and the guide rail can serve also as a protection cover.

In any of the linear motors with covers according to the invention described above, attachment members and screw apertures or the like may be arranged at the cover for attaching the linear motor with cover, as a unit, to an apparatus such as a copying machine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus for optically scanning and reading an image on an original document laid at a predetermined position, comprising:

lighting means for lighting the original document;

light turn-on means for turning on said lighting means;

a plurality of optical part carrying sliders capable of linearly reciprocating in a predetermined direction and carrying said lighting means on one of the optical part carrying sliders; and position detecting means for detecting positions of said sliders during reciprocation of the same, wherein said position detecting means and said light turn-on means are spaced from each other and are located at opposite sides of a center of a travel region of said sliders.

2. The image reading apparatus according to claim 1, wherein said position detecting means includes a magnetic encoder scale stationarily arranged along the reciprocating direction of said sliders, and a magnetism detecting element arranged on at least one of said sliders for integral reciprocation and opposed to said encoder scale.

3. The image reading apparatus according to claim 2, wherein said position detecting means includes a detecting circuit for detecting an output of said magnetism detecting element, and said detecting circuit is arranged near said magnetism detecting element.

4. The image reading apparatus according to claim 1, wherein said lighting means is a fluorescent lamp.

5. The image reading apparatus according to claim 4, wherein said light turn-on means includes an inverter circuit for turning on said fluorescent lamp.

6. The image reading apparatus according to claim 5, wherein said position detecting means includes a magnetic encoder scale stationarily arranged along the reciprocating direction of said sliders, a magnetism detecting element arranged on at least one of said sliders for integral reciprocation and opposed to said encoder scale, and a detecting circuit arranged near said magnetism detecting element for detecting an output of said magnetism detecting element, and a cable for electrically connecting said florescent lamp and said inverter circuit is connected to said florescent lamp through a position near said inverter circuit remote from said magnetism detecting element.

7. An image reading apparatus for optically scanning and reading an image on an original document laid at a predetermined position, comprising:

a plurality of sliders carrying optical parts and being capable of linearly reciprocating in a predetermined direction;

position detecting means for detecting positions of said sliders during reciprocation of the same; and an operation panel having a liquid crystal display for displaying various kinds of information, wherein said position detecting means and said operation panel are spaced from each other and located at opposite sides of a center of a travel region of said sliders.

8. The image reading apparatus according to claim 7, wherein said position detecting means includes a magnetic encoder scale stationarily arranged along the reciprocating direction of said sliders, and a magnetism detecting element arranged on at least one of said sliders for integral reciprocation and opposed to said encoder scale.

9. The image reading apparatus according to claim 8, wherein said position detecting means includes a detecting circuit for detecting an output of said magnetism detecting element, and said detecting circuit is arranged near said magnetism detecting element.

10. An image reading apparatus for optically scanning and reading an image on an original document laid at a predetermined position, comprising:

lighting means for lighting the original document;

light turn-on means for turning on said lighting means;

an optical part carrying slider capable of linearly reciprocating in a predetermined direction and carrying said lighting means; and position detecting means for detecting position of said slider during reciprocation of the same, wherein said position detecting means and said light turn-on means are spaced from each other and are located at opposite sides of a center of a travel region of said slider.

11. The image reading apparatus according to claim 10, wherein said position detecting means includes a magnetic encoder scale stationarily arranged along the reciprocating direction of said slider, and a magnetism detecting element arranged on said slider for integral reciprocation and opposed to said encoder scale.

12. The image reading apparatus according to claim 11, wherein said position detecting means includes a detecting circuit for detecting an output of said magnetism detecting element, and said detecting circuit is arranged near said magnetism detecting element.

13. The image reading apparatus according to claim 10, wherein said lighting means is a fluorescent lamp.

14. The image reading apparatus according to claim 13, wherein said light turn-on means includes an inverter circuit for turning on said fluorescent lamp.

15. The image reading apparatus according to claim 14, wherein said position detecting means includes a magnetic encoder scale stationarily arranged along the reciprocating direction of said slider, a magnetism detecting element arranged on said slider for integral reciprocation and opposed to said encoder scale, and a detecting circuit arranged near said magnetism detecting element for detecting an output of said magnetism detecting element, and a cable for electrically connecting said fluorescent lamp and said inverter circuit is connected to said fluorescent lamp through a position near said inverter circuit remote from said magnetism detecting element.

16. An image reading apparatus for optically scanning and reading an image on an original document laid at a predetermined position, comprising:

a slider carrying optical parts and being capable of linearly reciprocating in a predetermined direction;

position detecting means for detecting position of said slider during reciprocation of the same; and an operation panel having a liquid crystal display for displaying various kinds of information, wherein said position detecting means and said operation panel are spaced from each other and located at opposite sides of a center of a travel region of said slider.

17. The image reading apparatus according to claim 16, wherein said position detecting means includes a magnetic encoder scale stationarily arranged along the reciprocating direction of said slider, and a magnetism detecting element arranged on said slider for integral reciprocation and opposed to said encoder scale.

18. The image reading apparatus according to claim 17, wherein said position detecting means includes a detecting circuit for detecting an output of said magnetism detecting element, and said detecting circuit is arranged near said magnetism detecting element.

* * * * *